Dec. 5, 1961     PING KING TIEN     3,012,203
TRAVELING WAVE PARAMETRIC AMPLIFIER
Filed March 7, 1960     5 Sheets-Sheet 1

INVENTOR
*P. K. TIEN*
BY Harry C. Hart
ATTORNEY

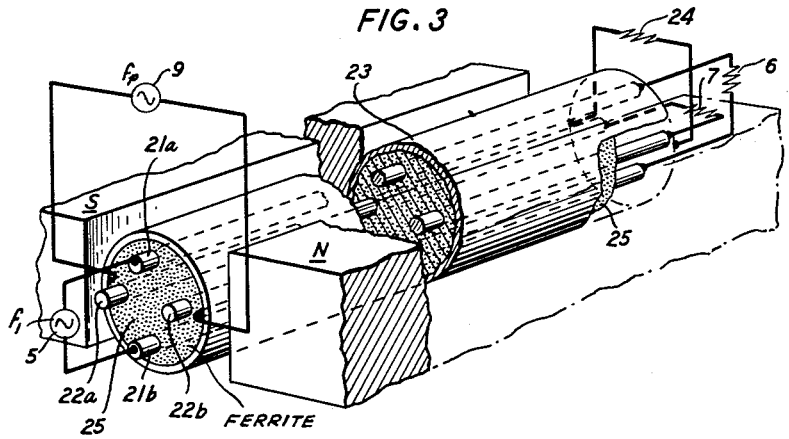
FIG. 3
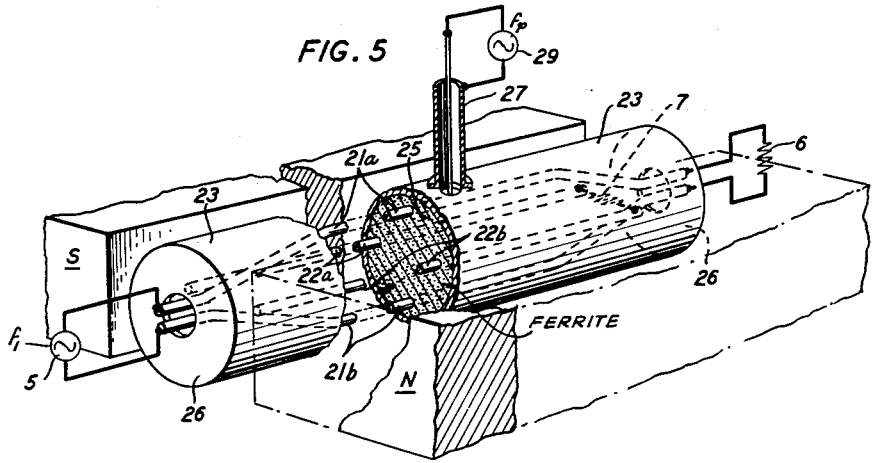
FIG. 4
FIG. 5

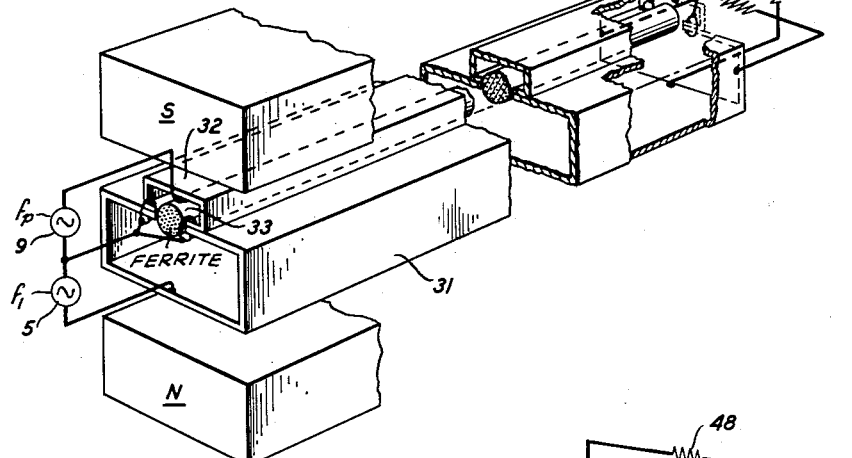
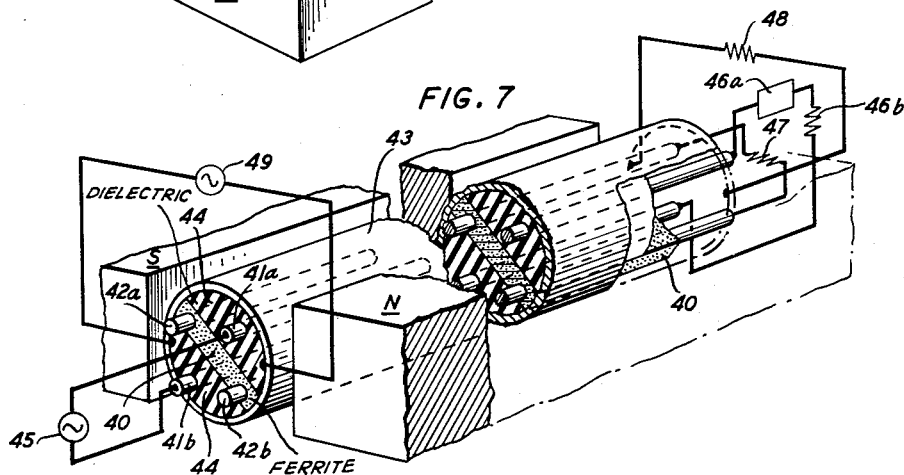
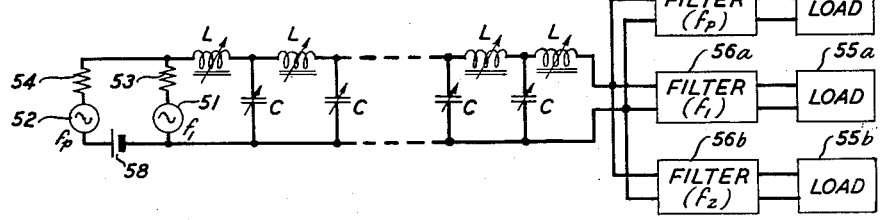

Dec. 5, 1961     PING KING TIEN     3,012,203
TRAVELING WAVE PARAMETRIC AMPLIFIER
Filed March 7, 1960     5 Sheets-Sheet 4
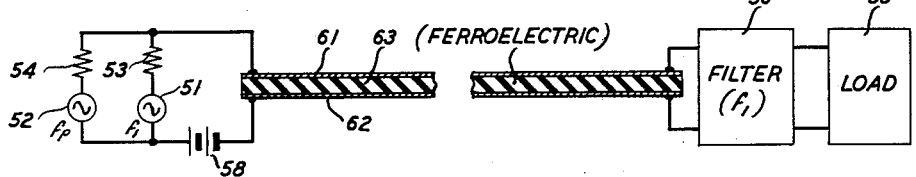
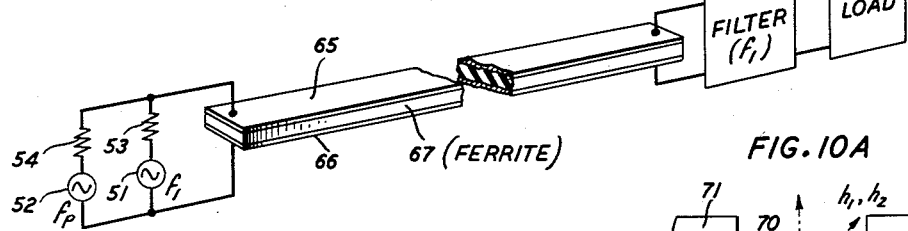
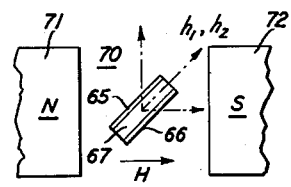
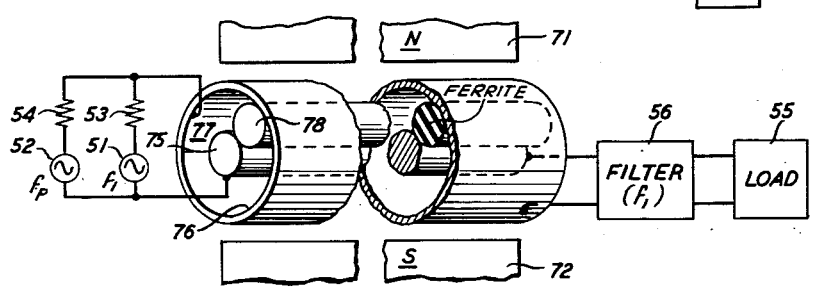
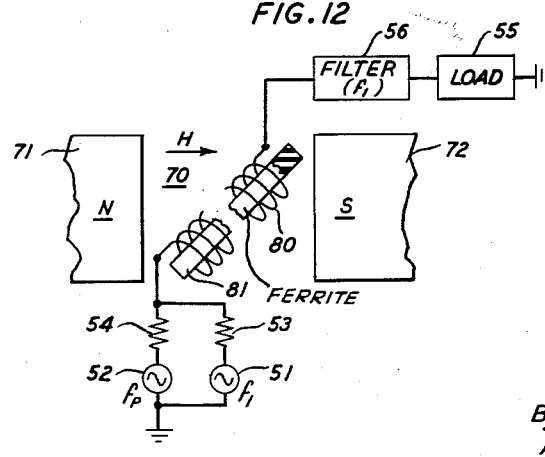
INVENTOR
P. K. TIEN
BY Harry C. Hart
ATTORNEY Dec. 5, 1961         PING KING TIEN         3,012,203

TRAVELING WAVE PARAMETRIC AMPLIFIER

Filed March 7, 1960         5 Sheets-Sheet 5

INVENTOR
P. K. TIEN

BY Harry E. Hart
ATTORNEY

United States Patent Office 3,012,203
Patented Dec. 5, 1961

3,012,203
TRAVELING WAVE PARAMETRIC AMPLIFIER
Ping King Tien, Chatham Township, Morris County,
N.J., assignor to Bell Telephone Laboratories, Incorporated, New York, N.Y., a corporation of New York
Filed Mar. 7, 1960, Ser. No. 13,310
18 Claims. (Cl. 330—5)

This application is a continuation-in-part of my applications Serial No. 724,103, filed March 26, 1958, now abandoned, and Serial No. 693,439, filed October 30, 1957, now abandoned. The first-named application is itself a continuation-in-part of an earlier application Serial No. 664,006, filed June 6, 1957, and, after the filing of the application first above named, allowed to become abandoned.

This invention deals with signal amplification, and more particularly with the amplification of a traveling signal wave by the introduction into it, in the course of its travel and at various points along its path, of energy derived from an external source.

In one of its principal known forms, as exemplified by J. R. Pierce Patent 2,636,948, granted April 28, 1953, a traveling wave amplifier tube comprises two extended and closely intercoupled transmission paths, one of which carries a signal wave and the other a stream of electrons originating in a thermionic cathode. The structure is normally such that the electric field associated with the traveling wave is traversed by the electron stream in the direction of travel of the field, and the structure is normally so proportioned that the velocities of travel of the field and of the stream are approximately alike. Under this condition the electric field acts on the stream to give rise to nonuniform charge density in the stream: to electron bunching; and the stream reacts on the field in such a way that the wave traveling along the wave path in the same direction as the stream, that is, the "forward wave" increases in amplitude with distance, while any wave that may travel against the stream, that is, a "backward wave" is little affected by the presence of the electrons of the stream. Thus, the device acts as an amplifier for a wave traveling in the same direction as the electron stream.

It is characteristic of such a traveling wave tube that it operates effectively throughout a comparatively wide band of frequencies. It is not suited, however, for operation at the very high frequencies of the microwave range. The fabrication of the tube requires high precision and close tolerances. For this reason the tube is both costly and fragile. Its operation requires high voltages. Therefore safeguards must be provided to prevent injury to operating and service personnel. The point of origin of the electron stream is a thermionic cathode, and this is a source of unavoidable noise, which accompanies the amplification furnished by the tube.

Among the objects of the present invention are to simplify the construction and reduce the delicacy and cost of a traveling wave amplifier and to reduce its inherent noise. These objects are attained by the elimination of the electron stream, along with the thermionic cathode at which it originates, and the high-voltage electrodes required for its control, and by the substitution for the stream, as an agent with which the traveling wave interacts, of a new wave phenomenon, namely, a wave of reactance variation.

It is known that, given a single mesh circuit that is tuned to resonance at a frequency $f_0$ and including a variable reactance element, if energy be pumped into the circuit by variation of this element at a rate $2f_0$ the circuit may break into self-oscillation at the frequency $f_0$; i.e., at a subharmonic of the driving frequency. Moreover, it is shown in E. Peterson Patents 1,884,844 and 1,884,845, October 25, 1932, that in the case of a two-mesh circuit of which the common branch contains a variable reactance element and of which the individual resonant frequencies are $f_1$ and $f_2$, if energy be pumped into both meshes by variation of the common reactance element at the rate $$f_p = f_1 + f_2 \qquad (1)$$

and in amount below an oscillation threshold, each mesh becomes a negative resistance amplifier for signals of, or approximately equal to, the resonant frequency of that mesh, in which case the current flowing in the other mesh is an auxiliary current. This result stems from interaction among the energies of the several frequencies which takes place, when Equation 1 is satisfied, through the reactance variation. Amplifiers that operate in this fashion have come to be known as "parametric" amplifiers. An application of H. Suhl, Serial No. 640,464, filed February 15, 1957, deals with a very high frequency apparatus embodying these principles. In this apparatus a resonator comprising a cavity is proportioned to support standing waves of two or more different geometrical dispositions, and of frequencies satisfying the Relation 1. The resonant cavity takes the place of the several meshes of the Peterson patents, and the several standing waves take the place of the mesh currents and of the current of the pumping energy source. The interaction between the standing waves is provided by the precession of the magnetization which takes place within a body or bodies of suitable magnetically polarizable ferromagnetic material, such as a ferrite, that exhibits the gyromagnetic effect at the frequency of the pumping wave when it is subjected to the influence of magnetic fields applied in a certain fashion.

The present invention extends the principles of parametric amplification by controlled reactance variation into the domain of traveling waves. It provides an extended, traveling wave-supporting structure, proportioned to support traveling waves of the frequencies of interest and preferably, also, to suppress waves of frequencies not of interest. Among the waves of interest is a wave of reactance variation, launched by the source of pumping energy. The others are the wave to be amplified and at least one auxiliary wave. The structure is proportioned to cause the waves of interest to travel with the phase speeds and group speeds that are most advantageous in promoting the gain-producing interaction among them; in particular with the phase speeds that satisfy a certain relation among the phase constants, to be expounded more fully below. The signal wave and an auxiliary wave or waves then grow, at the expense of the energy of the pumping wave, as they travel; they grow with distance along the extended structure.

The structure itself, which is at least several wavelengths long at the lowest frequency of interest, may take widely different forms. At one end of the scale it provides individual propagation paths, one for each of the waves of interest. These paths are advantageously physically distinct and separate, provision for interaction among the individual waves being made at suitable points or everywhere along the paths. Each path is advantageously tailored to support its own wave and no other: it is a relatively narrow-band path. The narrow band character of the individual paths operates to prevent the generation and growth of undesired modulation product waves.

At the other end of the scale the extended wave-supporting structure provides a single, relatively broadband transmission line or waveguide capable of supporting all the waves of interest, in which case their individual propagation paths are geometrically coincident and physically indistinguishable. Evidently, this makes for economy of apparatus which is purchased, however, at the price of greater severity of design requirements in that, without the exercise of care, the structure might fail to support all the waves of interest or might support waves not of interest whose presence might reduce the efficacy of the system. These more stringent design requirements can, however, be met in the following fashion: The desired interaction among the waves of interest can be secured by proportioning this common path to carry all the waves of interest in the same common mode. At the same time the waves not of interest, always of higher frequency than those of interest, can readily be suppressed by placing this high frequency cutoff only slightly above the highest frequency of interest in which case any unwanted higher frequency wave can normally not arise through the interaction among the desired waves. Moreover, even if it should arise fortuitously, it is characterized by a field configuration such that it cannot interact with any of the desired waves. Moreover, by following well-known design principles the wave-supporting structure may be so proportioned that the higher order modes can be supported, if at all, only above a frequency slightly lower than the lowest unwanted frequency but higher than the highest wanted frequency. The unwanted frequencies, therefore, even if they were to be excited or arise fortuitously, would appear principally in a higher order mode and hence with field configurations that do not make for interaction of the type with which the invention is concerned.

Between these two extremes the invention envisions two or more waves on one path, one or more on another path, and so on with appropriate provision, by adjustment of cutoff frequencies for the fundamental mode in the fashion described above, to establish any desired compromise between complexity of apparatus and severity of design requirements.

The present invention contemplates operation of such an extended traveling wave amplifier in two different ways. In one of these, a single auxiliary wave, termed an idler wave, is allowed to propagate, whereby three frequencies are intercoupled, and the frequency of the reactance variation wave must be higher than that of the signal wave. In the other mode of operation, at least two auxiliary waves are allowed to propagate, of which one is an idler and the other is an effective input wave, whereby four or more frequencies are intercoupled, and the frequency of the reactance variation wave may then be lower than that of the signal wave.

A parametric amplifier in which the frequency of the reactance variation wave may be less than that of the wave to be amplified offers advantages in that the provision of an appreciable amount of power at relatively short wavelengths sometimes presents formidable technical and economic problems. Thus, for example, the amplification of a three centimeter wave in a three-frequency system requires a source of reactance variation power of a wavelength less than three centimeters, whereas in an amplifier utilizing waves of four or more frequencies (generally, an $n$-frequency system) proportioned to operate in the manner described below, amplification of a three centimeter wave may be realized with a reactance variation power source of a wavelength greater than three centimeters.

In general, the larger the number of different frequencies that contribute to the operation (the larger the value of $n$) the higher may the signal frequency be as compared with that of the reactance variation.

However, the gain-bandwidth product of a three-frequency system is, other things being equal, greater than that of an $n$-frequency system. Thus, up to those frequencies where the provision of an appreciable amount of high frequency power for varying the reactance presents a problem, it is usually preferable to operate the apparatus in the three-frequency manner.

It has been found, furthermore, that advantages follow from operation with an odd number of frequencies, in contrast to an even number. For example, the gain-bandwidth product of a system in which $n=5$, while poorer than that for one in which $n=3$, is more favorable than that for which $n=4$. This is for the reason that, when waves of frequencies higher than the pump frequency are permitted to flow, certain of them detract from the gain-producing interaction among the three principal waves, while certain others add to it.

The presentation of the present invention will be most effective, from the standpoint of elucidation of its full implications, if attention is at first restricted to the simplest mode of operation; i.e., that in which the frequencies of interest are three in number, and only three. Later, with the principles of the simplest case well in mind, the presentation will be directed to the more general mode of operation, involving four or more different frequencies and hence two or more auxiliary waves.

Coming now to the illustration chosen, the invention, in this form, provides a first extended, wave-supporting propagation path, e.g., a transmission line or a waveguide, termed the signal line, and a second path, e.g., a second line or waveguide, termed the "idler" line, extended in close juxtaposition with the first one. Each of these lines is at least several wavelengths long at the lowest frequency of interest. These two lines are closely intercoupled, either at discrete points or continuously throughout their lengths, by way of a plurality of variable reactance elements or a variable reactance medium. Each of these lines is proportioned to carry traveling waves in a relatively narrow band centered on its assigned frequency; i.e., $f_1$ for the signal line and $f_2$ for the idler line, and is terminated to prevent reflection. A signal wave of a first frequency $f_1$ is introduced into the signal line, and the reactance elements, or the reactive medium, are varied at another frequency $f_p$ and in a fashion such that the reactance variation is itself a traveling wave. A convenient means for securing this traveling wave of reactance variation is evidently to provide a third extended wave-supporting propagation path, e.g., a third transmission line or waveguide, which carries the reactance variation wave to the successive variable elements, or to the successive parts of the reactive medium, as it is needed at each such element or part. Advantageously, each line is proportioned to exclude or suppress waves of frequencies other than those of its assigned frequency band.

Under these conditions it is found that, as the signal wave travels from the input terminals of the signal path to its output termination, an idler wave of frequency $f_2$ tends to be generated in the idler path, and that this idler wave likewise travels from its input terminals to its output termination. The idler frequency $f_2$ satisfies the relation $$f_2 = f_p - f_1 \tag{1a}$$

If the wave of this frequency is allowed to propagate, the amplitude of the signal wave is found to increase as it travels, and at the expense of pumping wave energy imparted to it from point to point along its path of travel, so that the output load carries a signal which is an amplified replica of the input signal. The same is true of the idler wave so that, if desired, the output signal may be withdrawn from the idler path with a frequency change from $f_1$ to $f_2$.

In the case of a variable-reactance amplifier for standing waves or localized oscillations, each of the frequencies of Equation 1 is evidently the rate of change of a corresponding phase angle $\varphi$. Thus, putting, for each subscript $i$, $$\omega_i = 2\pi f_i = \frac{d\varphi_i}{dt}$$

Equation 1 may be written $$\omega_p = \omega_1 + \omega_2 \tag{2}$$

or $$\frac{d\varphi_p}{dt} = \frac{d\varphi_1}{dt} + \frac{d\varphi_2}{dt} \qquad (3)$$

In each time increment $\Delta t$, the phase angle of each oscillation changes by an amount $$\Delta\varphi_i = \frac{d\varphi_i}{dt}\Delta t$$

wherefore, from (2) and (3)

$$\Delta\varphi_p = \Delta\varphi_1 + \Delta\varphi_2 \qquad (4)$$

Equation 4 states the requirements for interaction in a fashion that is more general than Equation 1, and applies, in substance, as well to the case of traveling waves as to the case of standing waves. Hence, designating the phase of each traveling wave by $\psi$, $$\Delta\psi_p = \Delta\psi_1 + \Delta\psi_2 \qquad (4a)$$

But in the case of traveling waves the phase angle $\psi_i$, for each component wave, depends on its space displacement in the direction of travel, as well as on the time. Thus $$\Delta\psi_i = \omega_i \Delta t - \beta_i \Delta x \qquad (5)$$

where each phase constant $$\beta_i = \frac{\omega_i}{v_i} \qquad (6)$$

and $v_i$ is the phase velocity of the wave of subscript $i$. Combining (6) with (5) gives $$\omega_p \Delta t - \beta_p \Delta x = \omega_1 \Delta t - \beta_1 \Delta x + \omega_2 \Delta t - \beta_2 \Delta x \qquad (7)$$

Introducing (2) into (7) and collecting terms gives $$\beta_p = \beta_1 + \beta_2 \qquad (8)$$

Equation 8 states a requirement that the apparatus must meet for maximum interaction among the traveling waves of a sort that gives rise to amplification.

Evidently, one solution of (8), in view of (2) and (6), is that the phase velocities of all the waves of interest shall be alike, i.e., $$v_p = v_1 = v_2 \qquad (9)$$

This is not, however, the only solution.

If the frequency $\omega_p$ of (2) and the phase constant $\beta_p$ of (8) be taken as fixed, the other frequencies and phase constants being allowed to vary in a fashion to maintain the equalities of (2) and (8), it is readily shown that, for optimum performance from the bandwidth standpoint, an additional requirement that should, insofar as it is possible, be met is $$\frac{d\omega_1}{d\beta_1} = \frac{d\omega_2}{d\beta_2} \qquad (10)$$

that is to say, the proportions of the wave-supporting structure should be such that the group velocity for the idler wave is equal to the group velocity for the signal wave.

The presence of an idler wave whose frequency satisfies the Relation 1 is essential for useful parametric interaction and consequent signal frequency gain. The gain thus provided may, if care be not exercised to prevent it, be offset by permitting the excessive development, propagation, and growth of an unwanted wave of frequency $$f'_2 = f_p + f_1 \qquad (11)$$

that has no such advantageous properties. Hence, as a safeguard of the gain afforded by the wave of the "difference" frequency $f_2$, i.e., the idler wave, it is advantageous to take steps to suppress the sum frequency wave of frequency $f'_2$; or at least to prevent the growth of such a wave to such proportions as to offset the desired growth of the idler. Various steps of well-known character may be taken to this end, e.g., adjustment of high and low frequency cutoffs of the propagating structures, use of filters and stop band devices, etc., as dictated by the wanted and unwanted frequencies. Devices of the latter sort that are suitable for the purpose are described by W. J. Dodds and R. W. Peter in "Filter Helix Traveling Wave Tube" published in the RCA Review for December 1953, vol. 14, page 502.

Additionally, reliance may be placed for the suppression of unwanted waves on the dispersive characteristics of the wave-supporting path. The utility of this approach stems from the fact that a large number of solutions of equations 2 and 8 exist other than the simplest solution given by Equation 9. It can be seen by substitution in 2 and 8 that there are, in fact, an infinitude of such other solutions, given by $$\left. \begin{array}{l} v_1 = \dfrac{v_p}{1 - \dfrac{k_1}{\omega_1}} \\ v_2 = \dfrac{v_p}{1 + \dfrac{k_1}{\omega_2}} \end{array} \right\} (0 < k_1 < \omega_1) \qquad (9a)$$

or $$\left. \begin{array}{l} v_1 = \dfrac{v_p}{1 + \dfrac{k_2}{\omega_1}} \\ v_2 = \dfrac{v_p}{1 - \dfrac{k_2}{\omega_2}} \end{array} \right\} (0 < k_2 < \omega_2) \qquad (9b)$$

The availability of the Relations $9a$ and $9b$ as solutions of Equations 2 and 8 serves two purposes:

First, it permits the use, for the waves of interest, of a dispersive wave-propagating structure, in contrast to a nondispersive one as required by Equation 9.

Second, the above restrictions on the magnitudes of $k_1$ and $k_2$ permit advantage to be taken of the dispersive characteristics of the structure in order that the frequencies and phase constants of the unwanted modulation product waves shall fail to satisfy equations having the form of Equations 2 and 8 but subscripts representing the unwanted waves, so that such waves shall be suppressed.

As explained above, the pumping wave travels along its transmission line or waveguide path, losing energy to the signal and idler waves as it goes. To prevent the existence of a backward pumping wave, the pumping path should be terminated in an impedance that is matched to the characteristic impedance of the pumping line. This impedance may be an ordinary load, but if so, pumping power is dissipated in the load. Such power dissipation serves no useful purpose and, for the sake of economy, it should if possible be avoided. Thus, in accordance with a further feature of the invention, the emergent pumping power is fed back into the input terminals of the pumping line, and the output terminals of the pumping line "see" the matched impedance of the input terminals of the pumping line.

It was remarked above that, in a traveling wave tube of the type in which the interaction is between a forward electromagnetic wave and an electron stream, the presence of a backward wave is harmless because it does not interact with the electron stream. So, too, in the case of the present invention: provided the signal wave and the idler wave have only forward components, the pumping wave may have a backward component of substantial magnitude without deleterious interaction with the signal wave or the idler wave. In analytical terms, the phase constant of the backward pumping wave is negative, so that it cannot satisfy the requirement of Equation 8. When the pumping wave has forward and backward components of substantially equal magnitudes, it becomes a standing wave. The invention, therefore, contemplates that the pumping energy may be delivered to the traveling signal and idler waves from a standing pumping wave. This condition may be realized by the provision of reflective terminations at each end of the pumping wave path. This arrangement, like the feedback path mentioned above, serves to conserve pumping power.

Especially when a backward pump wave is permitted to exist along with the desired forward pump wave, i.e., when a standing pump wave exists, it is important that the signal wave path and the idler wave path be terminated to prevent reflection. Otherwise, interaction might take place among the reflected waves and the structure would in effect become a standing wave parametric amplifier and would thus lose one of the major advantages of the traveling wave amplifier: i.e., for stability of operation, a standing wave parametric amplifier must be held below a threshold above which self-oscillation might take place.

In a form suitable for use at "low" frequencies, i.e., at frequencies in the range 60 cycles per second to 1 megacycle per second or so, the structure along which each of the waves travels may comprise a plurality of like discrete circuit sections, several in each single wavelength span, each having "lumped" inductance and capacitance, and the varying parameters which furnish the interpath couplings may be capacitive or inductive, as preferred. A variable capacitance may be provided by a reactance tube circuit, or a p-n junction semiconductive diode which is biased in reverse by a direct-current voltage. A variable inductance may be provided by a coil wound on a saturable core. For frequencies in the range in which circuit elements of this type are inappropriate, the signal wave path and the idler wave path may be constituted of a double strip transmission line, or of a path or paths in one or more waveguides. Capacitive coupling may be provided by a dielectric having ferroelectric properties; e.g., an extended p-n junction semiconductive diode biased in the reverse direction by a steady voltage. Inductive coupling may be provided by a rod or core of ferrite material suitably disposed and biased by a steady magnetic field to exhibit gyromagnetic effects. Thus, if separate paths are employed, they may be constituted of two open-wire lines, the two wires of the first or signal line pair being disposed in a horizontal plane and the two wires of the second or idler pair being disposed in a vertical plane midway between the first two, so that the four wires lie at the four corners of a rectangle. The pumping line may be a circular waveguide surrounding the wires and the coupling ferrite. In an alternative form, the signal and idler waves may coexist, as crossed electromagnetic fields, in a waveguide of rectangular cross-section, to which another waveguide of rectangular cross-section is coupled by way of a common longitudinal slot in their juxtaposed walls; and the necessary interaction may be provided by gyromagnetic effects within a rod of ferrite material which fills this slot and extends from end to end thereof. Indeed, the signal and idler waves may coexist and travel together in wave-supporting structures of many different configurations; a waveguide of rectangular cross-section, a strip line, a coaxial line, a helical guide, or the like, provided with a body of gyromagnetic material, suitably disposed and biased, to which pumping power is applied. Provided the paths of the several waves of interest are wholly or partly indistinguishable, the structure should be proportioned to support them all in a manner to promote interaction among them and to suppress all waves of unwanted frequencies.

In the case of gyromagnetic coupling by way of a ferrite sample, a steady magnetic field H is applied to the ferrite, as by an externally disposed magnet. The strength of this field is adjusted, in accordance with known principles, to bring the gyromagnetic resonance phenomena which form the basis of the necessary interaction into a desired part of the frequency range. For gyromagnetic interaction, certain spatial relations among the magnetic fields of the waves of interest must be met, namely:

(1) The magnetic vector $h_1$ or $h_2$, of one of the two lower-frequency waves ($f_1$ or $f_2$) has a component that is parallel to H;

(2) The magnetic vector, $h_2$ or $h_1$, of the other of the two lower-frequency waves ($f_2$ or $f_1$) has a component that is perpendicular to H; and (3) The magnetic vector $h_p$ of the pumping wave has a component that is perpendicular to H.

The coupling material employed in practicing the variable inductance forms of the invention may be any one which exhibits the necessary resonance behavior, for example a high resistivity manganese ferrite. The narrower the ferromagnetic resonance absorption line of the material, the better the performance of the traveling wave amplifier, especially from the standpoint of economy of the pumping power. Accordingly, and because of their exceptionally narrow resonance lines, yttrium iron garnets and the rare earth iron garnets are preferred.

Yttrium iron garnet has the chemical formula $Y_3Fe_2(FeO_4)_3$ and the crystal structure of garnet. The discovery of this material and of some of its magnetic properties was reported by F. Bertaut and F. Forrat in vol. 242 of Comptes Rendus at page 382 (January 16, 1956). Rare earth iron garnets are isomorphic. Subsequently, it has been recognized that such materials are representative of a new class of magnetic materials that are in some ways superior to ferrites. In recognition of this distinction, the new materials are now generally referred to in the art as garnets. Important magnetic properties of these materials are turned to account in an application of J. F. Dillon, Jr., Serial No. 621,276, filed November 9, 1956, now Patent 2,938,183, granted May 24, 1960.

In the standing wave ferromagnetic amplifier of the application of H. Suhl above mentioned, the structures employed for illustration were such that the frequencies of the several standing waves were harmonically related. No such requirement holds for the amplifier of the present invention. To the contrary, the frequencies involved may be incommensurably related to each other. This feature offers the advantage that any harmonics of either wave, which may be generated through unwanted second order effects, cannot become confused with the wanted signal wave.

Moreover, in the operation of the standing wave ferromagnetic amplifiers of the aforementioned Suhl application, it is a requirement for amplifier operation that the pumping power be held below a certain threshold of instability. Otherwise the apparatus might break into self-oscillation, in which case the signal to be amplified would be masked by the oscillatory energy. It is a feature of the present invention that there is no such threshold of instability, and consequently the apparatus has no tendency to break into self-oscillation. This is a consequence of the traveling wave character of the energy. Thus, an increment of wave energy which originates at one point of the system and which might, if constrained to remain at that point, make for self-oscillatory behavior, is immediately withdrawn as a traveling wave to another point of the system. In other words, the signal wave grows in the space dimension but it does not grow in the time dimension. Hence the apparatus is characterized by a high degree of stability.

It is a feature of the invention that it operates without benefit of any hot cathode or of the transport of charges through a semiconductor. Hence, sources of shot noise are absent; and the only noise introduced into the signal in the course of its amplification is so-called "Johnson" noise which is due to the fact that the circuit elements, and in particular the load, are at elevated temperatures as compared with the absolute zero of temperature. This one significant source of noise may be greatly reduced by refrigerating the amplifier. Better still, since the principal point of origin of such noise is the load, the latter alone may be refrigerated, being coupled into the amplifier circuit by way of a transformer.

The invention will be fully apprehended from the following detailed description of preferred embodiments thereof taken in connection with the appended drawings. As indicated above, specific embodiments of the three-path form of the invention, operating in the three-frequency manner, will be first described, after which consideration will be directed to embodiments in which the paths for two or more of the individual waves coincide and to operation of the various structures in the manner in which waves of four or more different frequencies are of interest.

In the drawings:

FIG. 3 is a diagram, partly in section, showing a traveling wave amplifier comprising two conductor pairs disposed within a circular waveguide and intercoupled by way of the resonance properties of ferromagnetic material;

FIG. 4 is a diagrammatic end view of the structure of FIG. 3 showing the distribution of magnetic fields within it;

FIG. 5 is a perspective diagram, partly in section, showing a modification of the structure of FIG. 3;

FIG. 6 is a perspective diagram, partly in section, showing a distributed-constant traveling wave amplifier comprising two intercoupled waveguides of rectangular cross-section;

FIG. 7 is a perspective diagram, partly in section, of a traveling wave amplifier especially suitable for operation in the four-frequency manner, comprising two conductor pairs disposed within a circular waveguide and intercoupled by way of the resonance properties of an element of ferromagnetic material;

FIG. 8 is a schematic circuit diagram illustrating a single-path, lumped constant traveling wave amplifier comprising variable series inductance elements and variable shunt capacitance elements;

FIG. 9 is a schematic circuit diagram showing a single-path, high frequency traveling wave amplifier having distributed variable capacitance;

FIG. 10 is a schematic circuit diagram showing a single-path, high frequency traveling wave amplifier having distributed variable inductance;

FIG. 10A is a diagram showing the manner in which a steady bias magnetic field is applied to the apparatus of FIG. 10;

FIG. 11 is a diagram, partly in perspective, showing a single-path coaxial line traveling wave amplifier having variable inductance;

FIG. 12 is a schematic circuit diagram showing a single-path helical traveling wave amplifier having variable inductive reactance;

Figure 1:
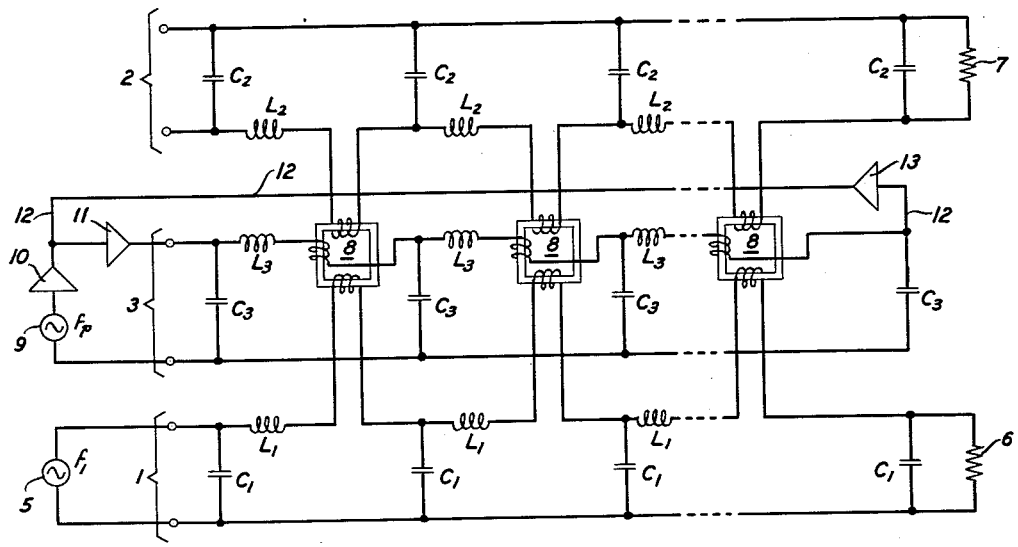
FIG. 1 is a schematic circuit diagram illustrating a lumped constant traveling wave amplifier including transmission paths that are individual to the several waves of interest and intercoupled by way of varying inductance.

Referring now to the drawings, FIG. 1 shows a traveling wave amplifier constructed for preferential operation in the three-frequency manner and having three distinct, extended wave-supporting paths, each comprising a transmission line proportioned to support a traveling wave of appropriate frequency, alone, and each at least several wavelengths long at the lowest frequency of interest. The first line 1 comprises a group of similar filter sections, each having series inductance $L_1$ and shunt capacitance $C_1$, connected in tandem. A large number of such sections is contemplated as indicated by broken line connections in the figure. Indeed, there should be at least several such sections within a single wavelength span at the lowest frequency of interest. This line is energized by a generator 5 of frequency $f_1$ connected to its input terminals, and its output terminals are connected to a matched load impedance 6. The second line 2, termed the idler line, is of similar configuration and of a like number of sections, but the inductance of each section is of magnitude $L_2$ and the capacitance of each section is of magnitude $C_2$. The input terminals of the idler line 2 are open and its output terminals are connected to a matched load impedance 7. Each section of the signal line 1 is coupled to the corresponding section of the idler line 2 by way of a transformer 8 having a ferromagnetic core carrying three windings. The lower winding is connected in series with one of the inductance elements $L_1$ of the signal line 1 and the upper winding is similarly connected in series with one of the inductance elements $L_2$ of the idler line 2. Each of these transformers 8 is provided with a third or control winding, and these third windings are in turn connected in series with the inductance elements $L_3$, shunted by capacitance elements $C_3$, of a third line 3. This third line, termed a pumping line, is energized at its input terminals by a pumping generator 9 of frequency $f_D$ through buffer amplifiers 10, 11.

The constants L, C, of the several lines are proportioned in relation to the parasitic resistances and conductances of these lines in such a way as to endow the several phase constants with magnitudes that satisfy Equation 8. The periodic lump loading of each of the lines 1, 2, 3, by the windings of the transformers 8 endows it with a bandpass characteristic, thus to suppress undesired waves.

The output terminals of the line 3 are connected by way of a feedback path 12, including a buffer 13, to its input terminals. Thus, the output terminals of this pumping line 3 "see" the impedance of the input terminals of the same line, which present to these output terminals a matched impedance. This is to avoid the dissipation of energy of the pumping generator in a resistive load and still maintain an impedance match such that the third line 3, like the first two lines, 1, 2, can support a traveling wave. In accordance with known principles, the electrical length of the feedback loop should be a whole number of wavelengths at the pumping frequency.

In operation in the three-frequency manner, energy of frequency $f_D$ is fed into the third line 3 from the pumping generator 9, travels down it as a wave and operates, by partial saturation of the cores of the transformers 8 in succession, to vary the mutual inductance which intercouples each of the several sections of the signal line 1 with the corresponding section of the idler line 2. This produces a wave of inductance variation which travels down both the signal line and the idler line at the propagation speed of the pumping line, which depends on the magnitudes of its inductance elements $L_3$ and its capacitance elements $C_3$. When, under this condition, a small signal of frequency $f_1$, derived from the signal generator 5, is applied to the input terminals of the signal line 1, a signal frequency wave tends to travel along this line, proportioned to support it, from its input terminals to its output terminals and at a speed $v_1$ determined by its constants. In the course of their travels, the pump wave interacts with the signal wave to promote the generation of an idler wave of frequency $f_2 = f_p - f_1$. This idler wave tends to travel, preferentially, along the idler line 2 that is proportioned to support it, and at a speed $v_2$ determined by the constants of the idler line. The pump wave also interacts with the idler wave to promote the generation of an increment of energy at the frequency of the signal wave. Provided only that Equation 8 is satisfied, and this relation may be secured by appropriate proportionment of the several lines, the signal frequency increment thus generated is in such phase as to reinforce the signal wave at each section of the signal line, so that the signal wave grows as it advances, through the addition to it of energy derived from the pumping generator 9 and applied to it through the transformers 8. Hence the signal, as it appears in the load 6, is greatly amplified as compared with the same signal as delivered by the generator 5.

Moreover, the same interaction makes for growth of the idler wave as it travels along the idler line. This growing idler wave travels from its input terminals, which for best results are open-circuited and hence provide complete reflection without change of phase, to its output terminals where it is dissipated in the matched impedance of the load 7. Hence the signal developed in this load is an amplified counterpart of the signal originating in the generator 5, but changed in frequency from $f_1$ to $f_2$. If, in addition to amplification, a frequency change is desired the wave in the idler line load 7 may be utilized instead of the wave in the signal line load 6. There is no restriction on the relative magnitudes of the frequencies $f_1$ and $f_2$. Hence the frequency change may be upward or downward, in dependence only on whether $f_p$ is greater or less than $2f_1$. There is also a tendency for energy of a frequency corresponding to the sum of the signal and pumping frequencies to be generated. However, advantageously, the several lines are proportioned to suppress it, whereby its buildup is prevented.

Figure 2:
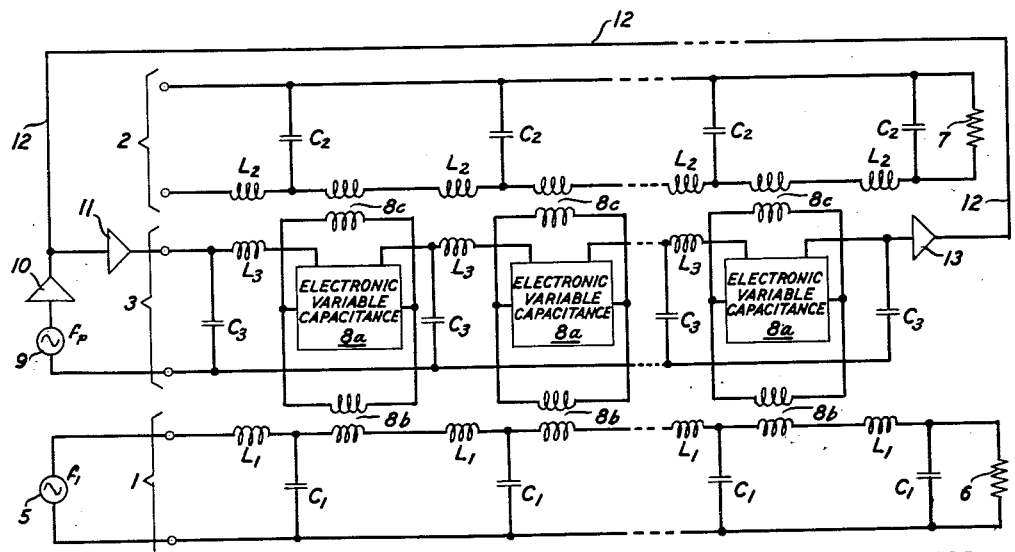
FIG. 2 is a schematic circuit diagram showing a modification of FIG. 1 in which the interpath coupling is by way of variable capacitance.

FIG. 2 shows an alternative traveling wave amplifier designed for operation in the three-frequency manner, of which the signal line 1 and the idler line 2 may be the same as the corresponding lines of FIG. 1. Each section of each of these lines is coupled to the similarly numbered adjacent section of the other line by way of a variable capacitance 8a which may conveniently be of an electronic type, e.g., a so-called reactance tube circuit. The effective capacitance of this network is transferred into the signal line by way of a transformer 8b and into the idler line by way of another transformer 8c. The input terminals of the electronic variable capacitance element 8a are connected, in the case of each line section, with the inductance element $L_3$ of the adjacent section of a third line 3, termed a pumping line, that has capacitance $C_3$ in each section. As in the case of FIG. 1, each line is proportioned to carry its own intended wave and no other. So, too, the several lines are proportioned to satisfy Equation 8. The output terminals of the pumping line are connected by way of a feedback path 12 including buffers 11, 13 to its own input terminals. Thus, as in the case of FIG. 1, the output terminals of the pumping line "see" the matched impedance of the input terminals of the same line.

The operation of the apparatus of FIG. 2 is similar except in minor detail to that of the apparatus of FIG. 1. In particular, when energy of frequency $f_p$ and derived from the pumping generator 9 is applied to the third line 3, a traveling wave of capacitance variation progresses along the signal line 1 and the idler line 2 at the wave speed $v_p$ of the pumping line 3, which depends on the magnitudes of its inductance per section $L_3$ and its capacitance per section $C_3$. When, now, a signal of frequency $f_1$, derived from the signal source 5, is applied to the signal line 1, this signal is propagated from the input terminals of the signal line 1 to its output terminals as a traveling wave of speed $v_1$ and, provided Equation 8 is satisfied, the capacitance variation wave causes a building up of the amplitude of the traveling signal wave, section by section, as it advances from the source 5 to the load 6, and a simultaneous generation and growth of an idler wave in the line 2. Thus an amplified replica of the input signal appears in the load 6. If, in addition to amplification, a frequency change from $f_1$ to $f_2$ is desired, the idler line load signal may be utilized in place of the signal line load signal. Similarly, it is advantageous to minimize the buildup of energy corresponding to the other principal modulation products of the interaction of the signal and pumping frequencies.

It is of interest to establish by analytical methods the fact that the traveling signal wave grows exponentially due to the introduction into it, in the course of its travel, of energy derived from the pumping generator. By way of illustration, the analysis is carried out for the apparatus of FIG. 2, wherein the coupling among the several transmission lines takes place by way of a common capacitance. Let the reciprocal of this coupling capacitance be denoted $g(z, t)$. The signal line 1 has a phase constant $\beta_1$, and a characteristic impedance $Z_{01}$ at an angular frequency $\omega_1$. The idler line 2 has a phase constant $\beta_2$, and a characteristic impedance $Z_{02}$ at an angular frequency $\omega_2$. Thus, $$\beta_1 = \omega_1 \sqrt{L_1 C_1}; \quad Z_{01} = \sqrt{\frac{L_1}{C_1}} \qquad (12)$$

$$\beta_2 = \omega_2 \sqrt{L_2 C_2}; \quad Z_{02} = \sqrt{\frac{L_2}{C_2}} \qquad (13)$$

The signal line 1 is excited at its input end by the signal source 5. As above stated, the idler line 2 is advantageously left open at the input end and is terminated at the output end by its characteristic impedance, as shown in the figure. In the presence of the varying capacitance $g(z, t)$ equations of the coupled system are $$\frac{\partial V_1(z, t)}{\partial z} = -L_1 \frac{\partial I_1(z, t)}{\partial t} - g(z, t) \int I_2(z, t) dt \qquad (14)$$

$$\frac{\partial I_1(z, t)}{\partial z} = -C_1 \frac{\partial V_1(z, t)}{\partial t} \qquad (15)$$

$$\frac{\partial V_2(z, t)}{\partial z} = -L_2 \frac{\partial I_2(z, t)}{\partial t} - g(z, t) \int I_1(z, t) dt \qquad (16)$$

$$\frac{\partial I_2(z, t)}{\partial z} = -C_2 \frac{\partial V_2(z, t)}{\partial t} \qquad (17)$$

Here $V_1$ and $I_1$ represent, respectively, the voltage and the current on the signal line and $V_2$ and $I_2$ those on the idler line. "$z$" is the distance, along either line, measured in the direction of propagation, and "$t$" is the time. The terms involving $g(z, t)$ are coupling terms which are responsible for the operation of the system. To simplify the analysis it may be assumed that $g(z, t)$ is a wave of sinusoidal character; i.e., one that is of the form $$g(z, t) = g_0 + \frac{1}{2}[g(z)e^{j\omega t} + g^*(z)e^{-j\omega t}] \qquad (18)$$

$$= g_0 + \frac{1}{2}g[e^{j(\omega t - \beta z)} + e^{-j(\omega t - \beta z)}] \qquad (19)$$

wherein, for simplicity, the subscript "$p$" has been omitted from the pump frequency. Equation 19 states, in effect, that the coupling reactance is controlled and varied sinusoidally about its mean value $g_0$, by a traveling wave of phase constant $\beta$, at an angular frequency $\omega$, traveling along the pumping line 3. This restriction is met, in practice, by the provision of pumping power in substantial excess of signal power, so that any variation of $g(z, t)$ at the signal frequency or the idler frequency is masked by its much greater variation at the pump frequency. The coupling terms of Equations 14 and 16 are then small, though essential, in comparison with the other terms. On this understanding, waves of frequencies other than those of interest, even if they should arise, are out of synchronism with those of interest and will therefore swing in and out of phase with them and so can contribute no cumulative effects.

Consideration will be restricted, for the present, to operation in the three-frequency manner, in which waves of the frequency $\omega_1$ appear on the signal line 1 and waves of the frequency $\omega_2$ appear on the idler line 2 that are related to the angular frequency $\omega$ of the pumping wave in accordance with the relation $$\omega_1+\omega_2=\omega \qquad (2a)$$

Combining (14) with (15), and (16) with (17) gives $$\frac{\partial^2 I_1(z,\,t)}{\partial z^2}=C_1L_1\frac{\partial^2 I_1(z,\,t)}{\partial t^2}+C_1\frac{\partial}{\partial t}[g(z,\,t)\int I_2(z,\,t)dt] \qquad (20)$$

$$\frac{\partial^2 I_2(z,\,t)}{\partial z^2}=C_2L_2\frac{\partial^2 I_2(z,\,t)}{\partial t^2}+C_2\frac{\partial}{\partial t}[g(z,\,t)\int I_1(z,\,t)dt] \qquad (21)$$

Putting $$I_1(z,\,t)=I_1(z)e^{j\omega_1 t}+I^*_1(z)e^{-j\omega_1 t} \qquad (22)$$
$$I_2(z,t)=I_2(z)e^{j\omega_2 t}+I^*_2(z)e^{-j\omega_2 t}$$

(20) and (21) are readily reduced to $$\frac{\partial^2 I_1(z)}{\partial z^2}=-\omega_1^2 L_1 C_1 I_1(z)-\frac{1}{2}C_1 g(z)\frac{\omega_1}{\omega_2}I^*_2(z) \qquad (23)$$

$$\frac{\partial^2 I^*_2(z)}{\partial z^2}=-\omega_2^2 L_2 C_2 I^*_2(z)-\frac{1}{2}C_2 g^*(z)\frac{\omega_2}{\omega_1}I_1(z) \qquad (24)$$

Similar equations may be obtained for $I_1^*(z,t)$ and $I_2(z,t)$ simply by interchanging the subscripts 1 and 2 in (23) and (24). Throughout the foregoing analytical development, * denotes the complex conjugate.

In Equations 23 and 24 the right-hand terms are coupling terms. If they were absent, each of these equations would contain only one variable, and it would be the well-known wave equation in the simplified form in which the effects of resistance are neglected. If a first derivative term representing resistance were added its solution, as is well known, would be of the form $$I(z,t)=Ae^{-\alpha_1 z}\cos(\omega_1 t-\beta_1 z)$$
$$+Be^{\alpha_1 z}\cos(\omega_1 t+\beta_1 z) \qquad (25)$$

wherein A and B are arbitrary constants. It is significant that the forward wave, designated by the first term, decays exponentially with distance, while the component which appears to grow with distance is the backward wave, designated by the second term. More realistically, since such a backward wave normally arises from reflection at an output termination, it decays with backward progress. In the case of a matched load, the constant B vanishes, and the solution consists of the first term alone, representing a wave that progresses forward and decays as it travels.

Subject to the restrictions that (a) the output termination of the signal and idler lines are proportioned for no reflection, so that backward waves in these lines may be disregarded; that (b) the coupling terms are treated as perturbations, whose influence over any short time or any short distance is small and that (c)

$$\beta_1+\beta_2=\beta \qquad (8a)$$

which may readily be achieved by appropriate proportioning of the inductances and capacitances of the three lines, solution of Equations 23 and 24 by straightforward methods yields, for the forward wave of current in the signal line, $$I_1(z,\,t)=\frac{1}{4}a[e^{\alpha z}\cos(\omega_1 t-\beta_1 z+\varphi)$$
$$+e^{-\alpha z}\cos(\omega_1 t-\beta_1 z+\varphi)] \qquad (25a)$$

and similar equations for $V_1$, $I_2$ and $V_2$. Here $a$ is an arbitrary constant which may be evaluated in terms of the amplitude and phase of the signal of the source, and $$\alpha=\frac{1}{4}\left[\frac{C_1 C_2 g^2}{\beta_1 \beta_2}\right]^{1/2} \qquad (26)$$

The solutions (25a) and (26) may readily be verified by substitution in original Equations 23 and 24.

Equation 25a shows that, in contrast to the forward current wave on an ordinary transmission line, the forward signal current wave on the signal line 1 of the present system is composed of two terms, traveling forward at the same speed, of which one decays while the other grows. The related equations give rise to the same conclusion for the signal voltage wave and for the waves of current and voltage on the idler line 2. With lines that are several wavelengths long the decaying component, in each case, falls to such a low level at the load 6, or 7 that it can be neglected in comparison with the growing component.

A similar analysis shows that if, instead of capacitive variation in dependence on potential, the line were to contain inductive elements which vary in dependence on the current through them, as indicated by the arrows on the inductive elements of FIG. 8, the result would be similar. A detailed analysis for the case of variable inductance coupling is set forth in a monograph by P. K. Tien entitled "Parametric Amplification and Frequency Mixing in Propagating Circuits," published in the Journal of Applied Physics for September 1958, vol. 29, page 1347, especially at pages 1348 and 1349. A more complex analysis further shows that, provided phase relations be properly maintained, a still more rapid growth of the signal wave with distance may be obtained when the capacitance and the inductance are simultaneously varied. The required phase relation is that variations of the series inductance elements shall be in phase opposition to those of the shunt capacitive elements.

Further analysis of the same sort shows that for the general case in which $$\beta=\beta_1+\beta_2+\Delta\beta \qquad (8b)$$

the gain of the system is reduced as $\Delta\beta$ departs from zero. The conditions for amplification in the three-frequency manner may therefore be summarized as follows:

$(i)$ $\omega=\omega_1+\omega_2$ (necessary) $\qquad (2)$ $(ii)$ $\beta\doteq\beta_1+\beta_2$ (necessary) $\qquad (8)$ $(iii)$ $\left(\frac{d\omega}{d\beta}\right)_1=\left(\frac{d\omega}{d\beta}\right)_2$ (desirable) $\qquad (10)$ When operation is in the three-frequency manner as above discussed, and to be discussed, condition $(i)$ is always satisfied. Condition $(ii)$ can be easily fulfilled by selection of proper proportions for the structures. Condition $(iii)$ ensures that condition $(ii)$ shall hold over a band of frequencies. As pointed out above, it indicates that the group velocities of the two lines are alike in the frequency band of amplification.

FIG. 3 depicts another illustrative embodiment of the present invention designed for operation in the three-frequency manner in the microwave range. It may be contrasted with the apparatus of FIGS. 1 and 2 in that the individual transmission paths for the three waves overlap each other to a substantial extent. Here the transmission path for the signal wave consists merely of two straight elongated conductors or wires 21a, 21b, disposed in a vertical plane while the idler wave path consists of a similar pair of conductors 22a, 22b disposed in the horizontal plane. As with FIGS. 1 and 2 a signal source 5, of frequency $f_1$, is connected to the input terminals of the signal line 21 while the input terminals of the idler line 22 are left open. The output terminals of each of these lines are connected to a matched impedance load 6, or 7.

The third transmission path for the pumping energy is, for example, provided by a circular waveguide 23 which surrounds the two open-wire lines 21, 22. (The third transmission path might, alternatively, be provided by a helical structure.) The third path may be energized by a pumping generator of appropriate construction. It is shown in the figure, for the sake of illustration, as a generator 9 connected to opposite points of its input end while a matched impedance load 24 may be coupled to the output end of the guide 23. The coupling is shown, for the sake of illustration, as a pair of terminals connected to the congruent points of the output end of the guide 23. Especially for operation in the three-frequency manner, the entire volume internal to the waveguide, except that occupied by the conductors of the signal line and the idler line, may advantageously be filled with a body 25 of suitable ferrite material characterized, when subjected to a steady magnetic field of suitable magnitude, by gyromagnetic resonance absorption within a desired frequency range. (A particularly advantageous resonance characteristic may be attained if the body 25 comprises magnetic laminations of yttrium-iron garnet material, each magnetic lamination or wafer extending the length of the waveguide 23 and having its main faces perpendicular to the lines of force emanating from the magnetic structure described below, and successive laminations being separated by diamagnetic laminations of synthetic sapphire. The region in which it is of especial importance to include this material is the region bounded by the four conductors of the signal line 21 and the idler line 22. The inclusion of the same material within the outer part of the cross-section of the waveguide 23; i.e., inside the guide but outside the open-wire lines, adds somewhat to the interwave coupling but tends somewhat to increase the losses. Whether or not the advantage offsets the disadvantage, and therefore whether or not it is desirable to include the ferrite material outside of the open-wire lines, depends on the characteristics of the available material and the details of the configuration of the amplifier.

The extended structure shown in FIG. 3 is advantageously so proportioned that the transmission paths therein extend over a plurality of operating wavelengths, for example, ten wavelengths of the signal wave.

FIG. 4 is a cross-sectional end view of the structure of FIG. 3 showing the configuration of the magnetic fields of the signal wave and the idler wave. It will be noted that these fields are everywhere crossed. The vector loops of the magnetic field due to the pumping wave lie in planes parallel to the plane of the conductors 21 which constitute the signal line. The entire structure is placed between the poles of a magnet the ends of which are shown marked N and S respectively. This magnet subjects the entire volume of the ferrite body 25 to a steady transverse magnetic field H, preferably in a plane parallel to the plane of the idler line conductors 22. With this disposition the three requirements stated above for interaction among the traveling waves by way of the gyromagnetic motion of magnetization of a ferromagnetic resonant material are met.

The magnitude of the steady external field of the magnet is to be adjusted, in accordance with known techniques and known principles, to a strength such that the ferrite material exhibits a strong and sharply selective absorption at a suitable frequency, for example 9 kilomegacycles (kmc.). With this choice for the frequency of the pumping generator 9 the frequency of the signal generator 5 may lie anywhere below 9 kmc. As a practical matter, however, and in order that the signal wave and the idler wave shall be able to travel at appropriately related speeds over similar structures, it is preferable that they be broadly of the same order of magnitude. Thus, for example, in three-frequency operation, with a signal frequency of 3 kmc. the idler frequency is 6 kmc. There is no restriction, however, to harmonic frequency relations. The signal frequency may just as well be 3.5 kmc. and the idler frequency may just as well be 5.5 kmc., or vice versa.

In the absence of the external waveguide 23 and the gyromagnetic material 25, the two conductors 21a and 21b would constitute a first "open-wire line" and the two conductors 22a and 22b would constitute a second "open-wire line." As is well known, such a line supports waves in the fundamental transverse electromagnetic (TEM) mode, without dispersion. In this mode, the electric vector extends from one conductor to the other and the magnetic vectors are closed loops surrounding the individual conductors as shown in FIG. 4. It is equally well known that this mode can exist only up to a frequency at which the spacing between the conductors is about one half wavelength. For higher frequencies, higher order modes come into existence, and when the spacing between the two conductors of the pair is a full wavelength, the second order mode is in full control. In this second order mode the magnetic lines linking the conductor 21a are directed in the same sense as those linking the conductor 21b: both clockwise or both counterclockwise. Hence, in the region between the two conductors, the magnetic lines linking the upper conductor 21a tend to nullify those linking the lower conductor 21b and the field associated with this conductor pair is zero at the midpoint between them.

This situation is not significantly modified by the presence of the other conductor pair or by the presence of the external waveguide 23. The presence of the ferrite core, however, modifies the situation in certain respects. First, the pump frequency for which the spacing between the conductors is one half wavelength is reduced. Second, the two-wire line is no longer nondispersive. Third, the structure can support a greater number of higher order modes, transverse electric (TE) or transverse magnetic (TM). Fourth, in the neighborhood of gyromagnetic resonance, the reactive properties of the medium change rapidly with frequency or with bias so that when the ferrite core is biased close to gyromagnetic resonance at the pump frequency it behaves as an inductive medium below that frequency and as a capacitive medium above it. The phase velocity for a wave of any specified frequency is inversely proportional to the square root of the product of the effective inductance of the medium by its effective capacitance. Hence it is always possible to find a magnitude of the steady bias field such that the phase constant relation of Equation 8 is satisfied for all the wanted frequencies.

Due regard should be had to these effects in the design of the apparatus. For example, the dispersive properties of the ferrite-loaded lines 21, 22 are to be taken account of in proportioning the structure so that the phase constant relation of Equation 8 is satisfied for the desired frequencies and is not satisfied for the unwanted frequencies. Furthermore, by proper selection of the spacing between the two wires of each pair, it can be arranged that the critical frequency, below which propagation takes place in the TEM mode and above which it takes place principally in a mode of higher order, shall be slightly higher than the highest wanted frequency and slightly lower than the lowest unwanted frequency. It is by properly controlling the parameters of the structure in its design and by properly proportioning its elements in its construction, that waves of all unwanted frequencies can be effectively screened out. While the design details are complicated, they are all well known in the art.

Thus, by taking advantage of the dispersive characteristics of the ferrite-loaded lines of FIG. 3, and of their tendency to support the waves of the higher frequencies in modes of higher order, waves of all unwanted frequencies, in particular the sum frequency wave, are suppressed. Furthermore, the signal line 22 and the idler line 23 will then carry the signal frequency wave and the idler frequency wave, respectively, and, because the spatial requirements for parametric interaction among the magnetic fields of these waves have been met, the signal and idler waves do not become mixed with one another. Hence, each of the conductor pairs 21 and 22 can carry its intended wave in the normal propagation mode but can carry the unwanted modulation product of lowest frequency, if at all, only in a higher order mode. With this arrangement interaction between the signal wave and the pump wave has no tendency to generate a sum frequency wave and, even if a sum frequency wave should arise fortuitously, its magnetic fields are so disposed that it has no tendency to interact degeneratively with the pump wave, thus to detract from the regenerative parametric interaction of the idler wave with the pump wave.

Similarly the waveguide 23 may be so designed that it propagates the desired pump wave in its fundamental mode and at the proper interaction speed $v_p$. By selecting its dimensions so that the undesired wave of lowest frequency is propagated, if at all, in a higher order mode, or at a speed differing substantially from $v_p$ or both, it may readily be arranged that interaction among the desired waves can give rise only to an undesired wave of higher order mode on the waveguide 23, and that any such wave, if one should arise fortuitously, would arise with a field configuration such as to prevent undesired interactions with the waves of interest.

In FIG. 3 the pumping power which may be dissipated in the load 24 represents a sheer waste. It is preferable, for the sake of economy, that as large a fraction as possible of the power of the pumping generator 9 be transferred into the signal wave and into the idler wave without absorption in any other way. As above indicated, provided the signal wave and the idler wave travel exclusively from the input ends of their respective lines to their output ends (and this is readily secured by connecting the output terminals of each of these lines to a matched impedance load), the pumping wave itself may have, in addition to its useful forward wave component, a substantial backward wave component which does not interact with the signal wave. A forward component and a backward component of like magnitudes together constitute a standing wave of the pumping frequency. Hence such a standing pumping wave is suitable for operation in accordance with the invention. It may be established in a waveguide of circular section, as shown in FIG. 5. This figure, otherwise like that of FIG. 3, differs in that each end of the waveguide 23 is closed by a conducting sheet or plug 26, constituting a node for the current in the guide walls and hence for the magnetic vectors within the guide. With this construction a magnetic antinode, and therefore an electric node, is to be found at any one of various points along the waveguide spaced from either end by an odd number of quarter wavelengths at the pumping frequency. At any such point pumping energy may be introduced into the guide 23 by way of a conventional coupling loop which is continuous with the inner conductor of a coaxial line 27 that is supplied with energy by the pumping generator 29.

The input ends of the signal line 21 of the device of FIG. 5 must be accessible for connection to them of the signal generator 5. They may conveniently be connected by way of a tapered line section which extends through a small aperture in the front end wall 26 of the waveguide 23. Similarly the output terminals of the signal line 21 to which the load 6 is connected may extend, by way of another tapered line section, through an aperture in the rear end wall 26 of the guide 23. The idler line 22, however, which need not be accessible at either end, may conveniently be contained entirely within the closed guide, its open input terminals, its loaded output terminals, and the load 7 connected to the latter being completely embedded in the ferrite matrix.

If preferred, resort may be had to the feedback techniques illustrated in FIGS. 1 and 2. It is well known in the microwave art that directional couplers may be employed as the high-frequency equivalents of the buffers of FIGS. 1 and 2.

Aside from the reflecting terminations 26 of FIG. 5 and the manner in which the pumping energy is introduced into the guide 23, the structure is the same as that of FIG. 3. Hence, all of the foregoing discussion of the prevention of unwanted waves in FIG. 3 applies equally to the apparatus of FIG. 5.

FIG. 6, likewise designed for operation in the three-frequency manner, shows an alternative to FIG. 3 in which the signal wave path is provided by one mode for a traveling wave within an open ended waveguide 31 of rectangular cross-section and the idler wave path is provided by a different mode, preferably spatially crossed with the first mode, within the same waveguide. Thus the magnetic vector loops of one of these modes may lie parallel to the longer faces of the guide walls, shown horizontal in the figure, while the magnetic vector loops of the other mode may lie parallel with its shorter faces, shown vertical in the figure. The third path, which carries the pumping wave, may comprise a second guide 32 of dimensions smaller than the first guide 31 and connected to it by way of a slot or aperture which extends from end to end of both of these guides in their common walls. The intermode coupling may be provided by a rod 33 of ferrite material which is disposed in and fills this slot from end to end. The necessary magnetic bias, to bring the resonance absorption of the material of this ferrite rod to the proper part of the frequency range may be secured, as in FIGS. 3 and 5, by a transverse magnetic field, of appropriate magnitude and direction, derived from a magnet N–S, the ends of whose poles are shown. Evidently the configuration of the three magnetic fields throughout the volume occupied by the coupling rod 33 is such as to meet the coupling requirements stated above.

A signal generator 5 is shown, for the sake of illustration, connected to the approximate midpoints of the upper and lower faces of the larger guide 31 at its input end. A pumping generator 9 is shown, for the sake of illustration, as similarly connected to the upper and lower faces of the smaller guide 32. The output end of the larger guide is terminated, for the signal wave, in a matched load impedance 6 in which the amplified signal is developed. The guide 31 is also terminated in an idler wave load 7. The output end of the pumping waveguide 32 is shown, for the sake of simplicity of illustration, as being similarly terminated in a matched load impedance 24. For the sake of economy it is preferred as a practical matter to avoid the dissipation of large amounts of pumping power in this load 24. Such avoidance may readily be secured either by the employment of a closed pumping waveguide, namely, the rectangular counterpart of the closed circular waveguide of FIG. 5, which supports a standing pumping wave, or by resort to the feedback technique illustrated in FIGS. 1 and 2.

The lower guide 31 being dimensioned in the fashion explained to support the signal wave and the idler wave in their fundamental modes, it cannot support any unwanted wave of higher frequency, unless perhaps in a higher order mode that cannot interact unfavorably with the desired waves. Similarly the longer walls (shown in the horizontal plane) of the upper guide 32 can be so proportioned that this guide supports the pump wave in its fundamental mode and the shorter walls of this guide (shown in the vertical plane) may be so proportioned that the guide cannot support the unwanted waves. Additionally since, as is well known, propagation speeds in waveguides depend, in general, on frequency the guides 31, 32 can be so proportioned that any unwanted wave which may come into existence in either guide shall travel at such a speed that it cannot interact unfavorably with the desired waves.

Attention has been thus far mainly directed to extended structure amplifying systems in which three waves (related in a manner such that the frequency of the pumping wave is equal to the sum of the frequencies of the signal and idler waves) are intercoupled through the agency of a variable reactance element, i.e., three-frequency operation. The principles of the present invention also apply to an extended traveling wave parametric amplifier wherein a signal wave, a pumping wave and two or more auxiliary waves are so intercoupled, and where, more significantly, the frequency of the pumping wave is *less than* that of the signal wave; i.e., to operation in the *n*-frequency manner. For the sake of illustration, this will be described in terms of a four-frequency example. The frequency relations that must be met will be best apprehended if, first, the frequency $f_1$ of Equation 1 be specified as that of the input wave (in the case of three-frequency operation, the signal wave) and be denoted Q. The frequency $f_2$ then becomes that of the idler, and may be denoted I. Similarly the pump frequency $f_p$ may be denoted P. With these substitutions, Equation 1 becomes $$P=Q+I \quad (1b)$$

Specifically, it has been found that amplification can be attained in a system constructed in accordance with the principles of the present invention if, with message and pumping waves injected into it and of frequencies S and P, respectively, the system propagates effective input and idler waves whose frequencies Q and I satisfy the relations $$P=Q+I \quad (27)$$

and $$S=P+Q \quad (28)$$

It will be noted that (27) is identical with (1) or (2) while (28) is not; in particular, (27) requires that the pump frequency be equal to the sum of two other frequencies, while (28) requires that it be equal to the difference between two other frequencies. Recognition of this feature leads to the view that the amplification process, in a four-frequency system, may be best understood if such a system is regarded, for purposes of clarity of presentation, as including intercoupled modulator, amplifier and demodulator portions, the amplifier being of the basic three-frequency type. Thinking then in terms of this model, assume that message and pumping waves (the pumping wave characterized by a lower frequency than that of the message wave) are fed into the modulator portion, and that of the modulation products formed therein only the propagation of the wave of the difference frequency S−P is encouraged. This difference frequency wave may be denoted Q and may be regarded as the effective input wave which is fed into the amplifier portion of the system together with a wave of the pumping frequency. As developed above in connection with the description of the invention operating in the three-frequency manner, amplification of this input wave, of frequency $$Q=S-P$$

may be realized if, of the modulation products formed by interaction with the pump wave in the amplifier portion, the growth of a wave whose frequency is given by $$P-Q$$

is encouraged. This wave serves as the idler in the amplifier portion of the system and its frequency is $$I=P-Q \quad (27a)$$

Evidently, the effective input wave and this idler satisfy the relation $$P=Q+I \quad (27)$$

Therefore, the amplifier portion of the system, operating by itself in the three-frequency manner in the fashion explained above, now delivers an amplified wave of the effective input frequency $$Q=S-P \quad (28a)$$

As the final step, this amplified output is now fed into the demodulator portion of the system along with a wave of the pumping frequency. Evidently, one of the modulation products formed in the demodulator is a wave of the frequency S, and hence a replica of the wave originally fed into the modulator portion of the system. The amplifier component of the system may be adjusted to more than offset the losses that are inherent in the modulator and demodulator portions and, accordingly, an amplified replica of the message wave may be abstracted from the demodulator portion of the system.

When the interaction between the waves originates in gyromagnetic resonance phenomena within a body of ferrite material, certain relations were stated above to be required for three-frequency operation, between the directions of the magnetic fields of the pump wave, the signal wave and the idler wave. In the case of four-frequency operation, like relations must hold individually for the modulation step, the amplification step, and the demodulation step. Simultaneous satisfaction of these three requirements is attended by no difficulties for the reason that they are entirely consistent.

The circuit arrangement of FIG. 1 can easily be modified to operate in the four-frequency manner in which the injection of message and pumping waves into the bottom or signal and middle or pumping transmission paths, respectively, results in the propagation in the system of two auxiliary waves, one in the bottom or signal path and another in the top or idler path. The one in the signal path serves as the effective input wave to the parametric amplifier portion of the system, while the wave propagated in the idler path serves as does the idler in three-frequency operation. Thus, this modified arrangement involves the interaction of waves of four frequencies by means of variable reactance elements.

The first requirements that must be met for successful operation in the four-frequency manner are the frequency and phase relations $$P=Q+I \quad (27)$$
$$S=P+Q \quad (28)$$
$$\beta_P=\beta_Q+\beta_I \quad (29)$$
$$\beta_S=\beta_P+\beta_Q \quad (30)$$

It will be noted from Equation 28 that the message frequency S is equal to the sum of the pump frequency P and the effective input frequency Q. Indeed, since the Q frequency wave is generated by a modulation process between the S wave and the P wave, the S wave may be regarded as the upper modulation product of the P wave with the Q wave. It is thus precisely one of the waves which, in the foregoing discussion of three-frequency operation, it was stated to be desirable to suppress. Its presence inevitably reduces the efficacy of the system as a whole, from the standpoint of amplification alone. It can, however, be prevented from masking the parametric gain by proportioning the signal and idler lines, respectively, in such a way that $$\frac{Z_{0s}}{S} > \frac{Z_{0i}}{I} \quad (31)$$

where $Z_{0s}$ and $Z_{0i}$ are the characteristic impedances of the signal path at the message frequency and of the idler path at the idler frequency, respectively. Satisfaction of (31) is unnecessary when $n$ is 3 or any odd number, or for the larger even values of $n$.

The conditions expressed in (29), (30) and (31) can be satisfied simply by properly selecting the circuit elements in the light of the frequencies of the waves injected into the modified arrangement of FIG. 1.

The herein-discussed modification of the circuit of FIG. 1 propagates a growing message wave and a growing effective input wave in the signal path, and a growing idler wave in the idler path. The signal path may advantageously include a filter proportioned to pass to the termination of the signal path the message wave only. Alternatively, the filter may be proportioned to pass to the termination of the signal path only the effective input wave propagated in the signal path. Also, if desired, an amplified counterpart of the message wave, but changed in frequency to that of the idler wave, may be abstracted from the idler path.

The principles herein set forth for the modification of the circuit of FIG. 1 are equally applicable to the arrangement of FIG. 2.

Another embodiment of the invention for use where more than one auxiliary frequency is propagated is shown in FIG. 7. In this embodiment, amplification in the four-frequency manner may be realized if, in addition to satisfying conditions (29) and (30), a revised form of (31) is also satisfied, namely:

$$\frac{Z_{0s}}{SF_s} > \frac{Z_{0i}}{IF_i} \tag{31a}$$

where $F_s$ and $F_i$ are the "filling factors" of the signal path and of the idler path, respectively. As with Equation 31 satisfaction of this requirement is not necessary for even values of $n$ that are greater than four or for any odd value of $n$. (Here "filling factor" is defined as the ratio of that part of the magnetic field of a system which occupies a (ferromagnetic) sample associated with that system to the total magnetic field of the system.)

The device shown in FIG. 7 includes pole piece members N and S, and a circular waveguide 43. Disposed within the guide 43, in a configuration similar to that depicted in FIG. 3, are conductor elements 41a and 41b and 42a and 42b which, respectively, define a signal path and an idler path. The elements 42a and 42b are held in place within the guide 43 by a body 40 of a suitable ferrite material which in turn may, for example, be held in place by being securely wedged within the guide 43. The elements 41a and 41b are maintained in position within the guide 43 by supporting bodies 44 of a suitable dielectric material, for example, a foam plastic material.

The device of FIG. 7 further includes a generator 45 for injecting a message wave into the signal path, a generator 49 for supplying pumping energy to the guide 43, and terminating circuits for the idler path, the signal path and the pumping energy path, which circuits include, respectively, an impedance 47, a filter 46a in circuit with an impedance element 46b, and an impedance element 48.

To secure the most favorable gyromagnetic interaction among all the component waves of interest and to minimize the excitation of undesired waves, the magnet pole pieces N and S may be so located with respect to the remainder of the apparatus that the direction of the biasing magnetic field H extends at an angle of substantially 45 degrees to the plane of the ferrite slab 40 and hence at 45 degrees in one direction to the plane of the conductors 41a, 41b of the message line and at 45 degrees in the opposite direction to the plane of the conductors 42a, 42b of the idler line. With this disposition of the biasing field, the magnetic field of the pump wave is normal to it, that of the message wave has a component parallel to it, that of the idler wave has a component parallel to it and that of the effective signal wave has a component perpendicular to it. Thus interaction between the pump wave and the message wave can generate the effective signal wave while interaction of the effective signal wave, in turn, with the pump wave can generate the idler wave.

The ferrite body 40 depicted in FIG. 7 is so shaped that the filling factor of the idler path is greater than that of the signal path, and it has been found that the depicted configuration thus satisfies the condition expressed in (31a). Additionally, proper selection of the frequencies of the message and pumping waves in the light of the proportions of the extended structure shown in FIG. 7 easily fulfills the requirements of (29) and (30).

As before, it is important that the region over which the various waves are intercoupled have a length at least several signal wavelengths.

With the conditions (29), (30) and (31a) satisfied, the device of FIG. 7 propagates growing signal and effective input waves in the signal path 41 (the filter 46a being available in the output circuit of the signal path to block one or the other wave from the impedance 46b), a reactance variation wave along the guide 73, and a growing idler wave in the idler path 42.

While only one specific means for satisfying the relation (31a) is depicted in FIG. 7, it is to be understood that other structures for similarly satisfying (31a) may easily be devised by those skilled in the art of transmission lines. Thus, for example (31a) may be satisfied for four-frequency operation of an amplifier such as that of FIG. 3, which includes a ferrite body within the entire volume internal to the waveguide 73, except that occupied by the conductors of the signal and idler lines, by proper selection of the diameters and spacings of the elements of the conductor pairs 21 and 22.

The extended structure shown in FIG. 6 may similarly be modified to satisfy the relations of (29), (30) and (31a) and, thus, the propagate four intercoupled waves. The modified structure may be so proportioned that the smaller guide supports the traveling message wave along with the pump wave, while the larger guide supports the effective input wave as well as the idler wave. Further, and by way of illustration only, the suggested modification of FIG. 6 may include an asymmetric ferrite body which extends into each of the waveguides of the device to provide filling factors compatible with the requirement of (31a).

Similarly, it is feasible in four-frequency operation to utilize as the reaction space one which includes only a pair of separate transmission paths between which the four waves to be intercoupled are divided.

The principles that govern operation in the four-frequency manner govern, as well, operation with waves of $n$ different frequencies, of which $n-2$ are auxiliary waves. In this event the signal frequency can be not only higher, but many times higher, than the pump frequency and, indeed, can be higher than each of the auxiliary waves as well. For operation in this fashion, Equations 27 and 28 are replaced by $$\left.\begin{array}{l} P = Q + I_1 \\ I_2 = P + Q \\ I_3 = P + I_2 \\ \quad \cdot \quad \cdot \quad \cdot \\ \quad \cdot \quad \cdot \quad \cdot \\ I_n = P + I_{n-1} \end{array}\right\} \tag{27b}$$

$$S = P + I_n \tag{28b}$$

And a relation of the form of Equation 8, 29 or 30 holds for each group of three phase constants. Thus $$\left.\begin{array}{l} \beta_p = \beta_Q + \beta_I \\ \quad \cdot \quad \cdot \quad \cdot \\ \quad \cdot \quad \cdot \quad \cdot \end{array}\right\} \tag{29a}$$

$$\beta_s = \beta_p + \beta_{I_n} \tag{30a}$$

Similarly, for optimum bandwidth, the group velocities, other than that of the pumping wave, should all be alike; ie., $$\frac{d\omega_Q}{d\beta_Q} = \frac{d_{I_1}}{d\beta_{I_1}} \quad \cdots \quad \frac{d\omega_{in}}{d\beta_{in}} = \frac{d\omega_s}{d\beta_s}$$

For successful operation, provision must be made for the travel of all the auxiliary waves and hence for the flow of power at all the auxiliary frequencies. Waves of all frequencies other than those of interest should, in addition, be suppressed. These considerations evidently require that the design of the apparatus be more refined as the number of the auxiliary waves increases; and even with optimum design, the efficiency of the amplifier falls with increase of the number of auxiliary waves. For these reasons operation in the three-frequency manner is preferred except in cases where a pumping wave of sufficiently high frequency is not available.

Figure 13:
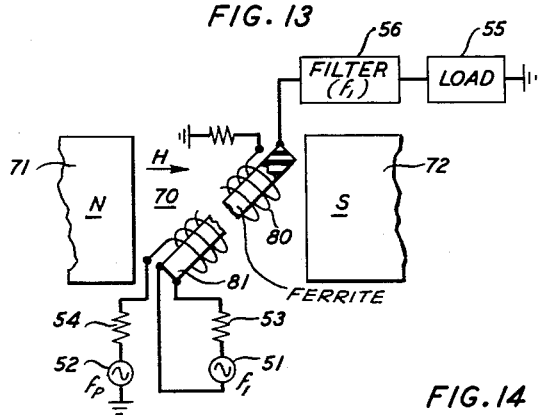
FIG. 13 is a schematic circuit diagram showing a modification of FIG. 12 in which a solid dielectric waveguide is ferromagnetically coupled to a helical conductor transmission line to provide a two-path traveling wave amplifier.

Returning now to a consideration of some of the many other structures with which the invention may be practiced, in the three-frequency manner or the $n$-frequency manner or in both ways, while it is often convenient, it is generally not always necessary to provide structurally distinct paths for the several waves. Indeed, particularly economical embodiments result when all of the necessary paths are coalesced so as to be structurally indistinguishable. Arrangements of this kind are shown in FIGS. 8 through 12 and 14, while FIGS. 13 and 15 illustrate partial coalescence of individual wave paths. Considering these embodiments in greater detail, FIG. 8 shows a traveling wave amplifier comprising a single chain of a large number of similar filter sections each having series inductance L and shunt capacitance C. It is energized by a first generator 51 of signal frequency $f_1$ connected to the input terminals and also by a second generator 52 of pumping frequency $f_p$ connected to the same input terminals. Direct interaction between these generators may be prevented in any well-known fashion by inclusion, in series with each of them, of a filter, a circulator, a buffer, a directional coupler, or the like, here shown, for the sake of simplicity, as a padding resistor 53, 54.

The line is many wavelengths long and has at least several sections in each single wavelength span at the lowest frequency of interest. It is proportioned to support all waves of interest, to satisfy Equation 8 for those waves and to suppress waves not of interest. The line, by virtue of its configuration, is a "low-pass" structure of the class analyzed by H. H. Skilling in "Electric Transmission Line" (McGraw-Hill, 1951), at page 232; hence the suppression of unwanted waves can readily be accomplished by locating its upper cut-off frequency just above the highest frequency of interest.

The output terminals of the line are connected to loads 55a, 55b and 55c through filters 56a, 56b and 55c proportioned to pass energy of the signal, idler and pump frequencies, respectively, and to reject other frequencies. Each of the filter-load combinations is proportioned to terminate the line in its characteristic impedance in the center of the passband of the filter. If preferred, any one of the loads, for example the pump load 55c, may be replaced by a feedback path as in FIGS. 1 and 2. In operation, an amplified signal appears in the load 55a. If, in addition to gain, a frequency change is desired, the amplified version of the input signal may be withdrawn, instead, from the idler load 55b.

Either the series inductance elements or the shunt capacitance elements are to be varied, as indicated by the arrows or, provided phase relations are taken care of as discussed below, both may be varied. Variation of the inductance elements may be secured by providing each of them with a ferromagnetic core characterized by a nonlinear relation holding between the current in its winding and its inductance, and by the provision of a bias current, furnished by a battery 58, of a magnitude to adjust the mean inductance value about which the variations take place. Variation of the capacitance elements may be secured by providing each condenser with a dielectric characterized by a nonlinear relation between the voltage across it and its capacitance, and by the provision of a bias voltage, derived from the battery 58, to adjust the mean value of the capacitance about which its variations take place.

In accordance with the invention, furthermore, these variations are under the principal control of the pumping generator 52. This result follows when the energy of the pumping generator 52 overpowers that of the signal generator 51.

The mathematical analysis given above for FIG. 2 takes no account of the separateness of the individual wave paths. Hence the conclusions derived from it apply equally well to cases, such as that of FIG. 8, in which the paths are coalesced.

As indicated above, both the series inductance elements and the shunt capacitance elements may be varied under control of the pumping energy source and, provided these variations are effected in proper phase, their effects are additive. It is significant that, with the structure of FIG. 8, the required phase relations are automatically satisfied with a single pump source 52 and a single bias source 58, as will be understood from the following considerations.

The inductance of a coil wound on a ferromagnetic core is reduced as the current through the coil increases toward saturation. Similarly the capacitance of a condenser of which the dielectric is of ferroelectric material is reduced as the voltage applied to the condenser increases toward saturation. Hence, an increase of current through one of the series inductance coils L reduces its inductive reactance and an increase of the voltage applied to one of the shunt condensers C increases its capacitive reactance. For additive combination of the variable reactance effects, it is desirable that the variations of these reactances take place in phase opposition. Because of the reciprocal relation between capacitance and capacitive reactance, these variations do, indeed, take place in phase opposition provided only that the voltage across any of the shunt condensers C is in phase with the current through the following coil L. As is well known, such phase coincidence of current and voltage does in fact take place in the case of an infinitely long line or, in the case of a line of restricted length, provided it is terminated in its characteristic impedance. Because the line of FIG. 8 is so terminated, at the pump frequency $f_p$, by the filter 56c and the load 55c, current and voltage are in phase coincidence throughout the major part of the length of the line and hence the capacitance and inductance variations take place in the fashion required for the additive combination of their effects.

FIG. 8, with its series inductance elements and shunt capacitance elements is the lumped circuit equivalent of an ordinary transmission line for which the only mode of operation is the transverse electromagnetic or TEM mode. Waveguides, however, operate rather in other modes, e.g., the transverse electric or TE mode and the transverse magnetic or TM mode. The lumped circuit equivalent of the former has inductance elements in series and antiresonant circuits in shunt, while that of the latter has resonant circuits in series and capacitance elements in shunt. An analysis closely paralleling the foregoing one establishes that the invention is equally applicable to these modified situations, and that a signal wave launched into one end of a guide operating in one of these other modes grows as it travels from end to end of it, at the expense of the energy of the pumping wave.

FIG. 9 shows a continuous, high frequency, double strip transmission line having provision for variation of its capacitive shunt reactance. It comprises two flat strips 61, 62 of metal spaced apart by a slab 63 of a material having a variable, voltage-responsive, dielectric constant such as ferroelectric material. To the input terminals of the line the signal generator 51 and the pumping generator 52 are connected as in FIG. 8, and the output terminals of the line are connected, also as in FIG. 8, through a filter 56 to a matched load 55. (In this figure, and in those to follow, individual filters and loads for the pump and idler waves may be included if desired. In the absence of the double interaction of FIG. 8, it is necessary only to ensure that interaction among backward waves cannot take place, and this is assured by the suppression of any one of the backward waves, in this case the backward signal wave.) A battery 58 is included in series with the generators 51, 52 to supply a steady potential difference between the two conductors 61, 62 of the strip line, thus to establish a bias in the ferroelectric material 63 and so provide it with a preassigned mean fixed capacitance per unit length, above and below which its capacitance varies. The line is proportioned to carry traveling waves of the frequencies of interest in the same mode and either to exclude waves not of interest or to restrict them to higher order modes in which parametric interaction cannot take place.

FIG. 10 shows an embodiment of the invention in which provision is made for variation of the inductive reactance. It comprises two extended conductors 65, 66 in the form of long metal strips having between them a slab 67 of a material, such as high-resistivity manganese ferrite or yttrium-iron garnet, capable of gyromagnetic resonance in th efrequency range of interest. In addition to their ferromagnetic properties any of these materials is normally characterized by a fixed dielectric constant substantially in excess of that of air; e.g., a dielectric constant of the order of 10. A signal wave source 51 of frequency $f_1$ and a pumping wave source 52 of frequency $f_p$ are connected, as before, to the input terminals of the line at one end of the two metal strips 65, 66 while a matched load 55 is connected to the output terminals at the other ends of the strips and by way of a filter 56.

The long dimension of the line extends from its input terminals to its output terminals and embraces many wavelengths at the lowest frequency of interest. Its short dimension extends in a direction normal to the strips and to the ferromagnetic slab between them. The intermediate dimension extends laterally across each strip. To meet the geometrical requirements for gyromagnetic interaction among the various fields as set forth above, the line may be placed in an air gap 70 between the poles 71, 72 of a magnet which provides, in this air gap, a steady magnetic bias field H, with the intermediate dimension of the line disposed at about 45 degrees to the direction of the steady field H. This arrangement is shown in FIG. 10A. With this disposition each of the high frequency magnetic fields $h_1$, $h_2$ and $h_p$, associated with the signal wave, the idler wave and the pumping wave respectively in their normal or fundamental modes, may be regarded as constituted of two components, substantially alike in magnitude, one extending in the same direction as the bias field H and the other extending in a direction perpendicular to H. Interaction in the fashion required for the transfer of energy from the pumping wave to the signal and idler waves then takes place in the following fashion: From the third geometrical requirement set forth above the useful component of the pumping wave is the one that is perpendicular to the bias field H. Interaction with this component then takes place both by the parallel component of the signal wave and the perpendicular component of the idler wave, and also by the perpendicular component of the signal wave and the parallel component of the idler wave. This dual action goes a long way to offset the inefficiency which might otherwise result from the fact that the parallel component of the pumping wave does not contribute to the interaction. The proportions of the line are such that any wave of frequency higher than the pump frequency is propagated, if at all, in a higher order mode so that interaction between the pump wave and the signal wave does not tend to develop it.

FIG. 11 shows an embodiment of the invention in a coaxial transmission line comprising an inner conductor 75, an outer conductor 76 and a field-supporting space 77 between them. As before, a signal generator 51 and a pumping generator 52 are connected to the input terminals of the line and a matched load 55 is connected to its output terminals by way of a filter 56. The proportions are such as to promote the waves of interest, to suppress others, and to satisfy Equation 8. To produce interaction in accordance with the invention a rod 78 of material capable of gyromagnetic resonance in the frequency range of interest, e.g., a ferrite, is interposed between the inner conductor 75 and the outer conductor 76. If preferred, a number of such rods may be employed, preferably disposed symmetrically about the axis of the line. Interaction among the three waves of interest in accordance with the invention may be insured by disposing this line in an air gap between the poles 71, 72 of a magnet which provides, in its air gap and therefore in the gyromagnetic body, a steady magnetic field H. For best results the line should be so oriented that the gyromagnetic body lies in a plane passing through the inner conductor 75 and at 45 degrees to the direction of the bias field H. Two or four such bodies may readily be placed in one or two such planes.

The electromagnetic field disposition and distribution in the double strip line of FIG. 9 and in that of FIG. 10 is the same, in kind, as the field distribution of an open-wire transmission line. The field distributions in the structure of FIG. 10, for example, are discussed in a monograph by H. Suhl and L. R. Walker, entitled "Topics in Guided Wave Propagation Through Gyromagnetic Media," published in The Bell System Technical Journal for May, July and September 1954 (vol. 33), especially in section 2.2 of Part II and in section 2 of Part III. Similarly the field distribution in the apparatus of FIG. 11 is the same as that in a coaxial transmission line. In each case, as is well known, a critical frequency exists, i.e., a low frequency cutoff for the higher order modes, such that any propagation of a wave of higher frequency than this critical frequency takes place, if at all, principally in a higher order mode. Such a wave of higher order mode cannot be generated by interaction among the desired waves nor, if it should arise fortuitously, can it interact with any of them. Hence in the apparatus of FIGS. 9, 10 and 11, the propagation and growth of unwanted waves of higher frequency than the pump wave is readily prevented simply by proportioning the structures in such a way that the low frequency cutoff for the higher order modes lies slightly higher, on the frequency scale, than the pump frequency.

FIG. 12 shows an embodiment of the invention in which the transmission lines of the earlier figures are replaced by a helical conductor 80 and a core 81 of a material, capable of gyromagnetic resonance in the frequency range of interest, e.g., a ferrite, disposed on the axis of the helix. The helix is supplied by sources 51 and 52, and is connected through a filter 56 to a matched load 55. It is well known that, while such a helix is highly dispersive for frequencies below a certain threshold frequency which depends on the geometry of the helix, the phase velocities of waves along the helix are substantially independent of frequency over a restricted frequency range above this threshold frequency. Hence a helix, operated above this threshold frequency, may readily satisfy the relation required by Equation 8 among the phase constants of the several waves; e.g., that of Equation 9. Interaction between these waves may be secured by disposing the helical line with its gyromagnetic core in the air gap 70 between the poles 71, 72 of a magnet which provides a steady field H within this air gap. Because of the configuration of the fields in a helical transmission line, the line should be disposed in the air gap 70 of the bias-field producing magnet with its long dimension at 45 degrees to the direction of the bias field H.

At still higher frequencies, the helix is characterized by a "forbidden region" in which wave propagation cannot take place at all. This matter is discussed by J. R. Pierce and P. K. Tien in a monograph, entitled "Coupling of Modes in Helixes," published in the Proceedings of the IRE for September 1954, vol. 42, page 1389. Consequently, by appropriate proportionment of the helix, the high frequency cutoff may be placed somewhat above the pump frequency, and the frequency of any unwanted wave, such as the sum frequency wave, falls in the forbidden region so that the unwanted wave is suppressed.

As remarked above, the dielectric constant of a gyromagnetically resonant material such as a ferrite is of the order of 10. Hence a rod of such material is capable of operating as a dielectric waveguide. FIG. 13 shows a modification of the structure of FIG. 12 which turns this property to account by employing the axial ferrite rod 81 itself as a dielectric waveguide. For best distribution of the magnetic fields within the rod 81, its cross-section is preferably elliptical, and the signal source 51 is connected to the opposite ends of the minor axis of the ellipse of the cross-section of the ferrite rod 81 at the input end of the rod 81 itself, while the pumping generator 52 alone is connected to the input end of the helical conductor 80. The magnetic fields which obtain with this structure are in all significant particulars the same in configuration as those which obtain with the structure of FIG. 12, and the interaction between them may as before be secured by disposing the line and its ferrite core 81 in an air gap 70 between the poles 71, 72 of a magnet, with its length and the major axis of the ellipse of its cross-section at 45 degrees to a steady field H provided by the magnet. Any desired relation between the phase speeds of the several waves, e.g., equality, may be assured by appropriate proportionment of the helix pitch of the conductor 80. Unwanted waves may be suppressed by arranging that their frequencies fall in the forbidden region.

The structures of FIGS. 8–13 are inherently of a broad band-pass character. Hence, merely by making provision for the travel of all the necessary auxiliary waves and for exclusion of the unwanted ones, any one of them can be operated in the $n$-frequency manner.

Figure 14:
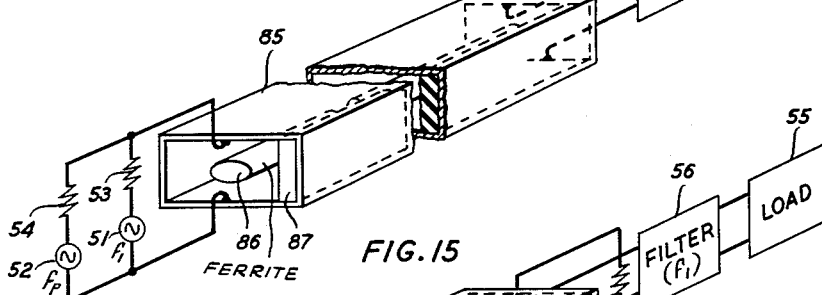
FIG. 14 is a schematic circuit diagram showing a single-path traveling wave amplifier comprising a hollow conductive waveguide having variable inductive reactance.
Figure 15:
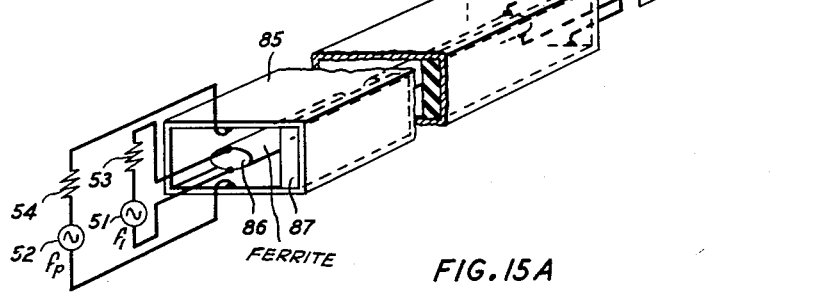
FIG. 15 is a schematic circuit diagram showing a two-path traveling wave amplifier in which a solid dielectric waveguide is ferromagnetically coupled to a hollow waveguide.
Figure 15A:
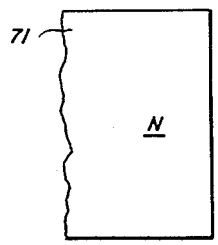
FIG. 15A is a diagram showing the manner in which a bias field is applied to the apparatus of FIG. 14 or to that of FIG. 15.

FIG. 14 shows a structure especially adapted for three-frequency operation and which, operating in this manner, is an alternative to the structure of FIG. 12 in that the helical conductor 30 of FIG. 12 is replaced by a conventional hollow waveguide 85 of rectangular cross-section having a rod 86 of suitable material such as a ferrite axially disposed in it and extending from end to end of the guide 85. A signal wave source 51 and a pumping wave source 52 are together connected through isolating elements 53, 54 to the midpoints of the input ends of the longer sides of the guide 85. The dimensions of the guide should be such that its low frequency cutoff is below the lowest frequency which it is required to carry: in three-frequency operation usually the signal frequency. The idler wave may be of a frequency slightly higher, and may be propagated in the same mode. The pump wave is then somewhat more than one octave higher than the signal. It may be propagated in a different mode which nevertheless satisfies the spatial vector requirements stated above, within the interaction medium. The ferrite rod 86 serves as a coupling means between the electromagnetic fields of the several traveling waves so that, as they advance from the input terminals of the guide to its output terminals, energy is abstracted from the pumping wave and introduced into the signal wave, and also into the idler wave which is automatically generated. A strip of ordinary dielectric material 87 may be included in the guide 85 to bring the phase speed of the pumping wave into a desired relation, e.g., that of Equation 8, with the phase speeds of the signal and idler waves, and, at the same time, to distort the configurations of the high frequency magnetic fields within the guide to satisfy the spatial vector requirements despite the difference in propagation modes. At the end of their travel the waves are withdrawn from output terminals connected to the midpoints of the longer sides of the guide 85. As thus withdrawn, the signal and idler waves are amplified while the energy of the pumping wave is reduced. The desired amplified signal wave may be applied to a load 55 through a filter 56 proportioned to reject the undesired idler and pumping waves. Interaction between the various fields within the guide is secured, as shown in FIG. 15A, by placement of the entire structure in an air gap 70 between the poles 71, 72 of a magnet, with the long dimension of the cross-section at 45 degrees to the direction of the magnetic field H.

As in the case of the apparatus of FIGS. 12 and 13, the ferrite rod 86 of FIG. 14 is normally characterized by a dielectric constant of the order of 10. Hence, a rod of such material is capable of operating as a dielectric waveguide. FIG. 15 shows an alternative to the structure of FIG. 14 in which the ferrite rod 86 serves in this fashion. For optimal configuration of the magnetic fields within it the ferrite rod 86 should preferably have an elliptical cross-section. By way of illustration, it is employed to support the signal wave and the idler wave, while the hollow metal guide 85 needs support only the pumping wave. The hollow metal guide may therefore be proportioned so that its low frequency cutoff lies below the pumping frequency, but not necessarily below the other frequencies involved. Thus, the signal generator 51 is connected to the upper and lower ends, respectively, of the minor axis of the ellipse of the cross-section of the rod 86 near to its input end, while the pumping generator 52 is connected as before to the midpoints of the longer side walls of the hollow guide 85. As before, a strip 87 of ordinary dielectric material may be included in the hollow guide 85 to secure optimal relations between the phase speeds of the several waves. As before, interaction between the various fields is secured, as shown in FIG. 15A, by placement of the entire structure in an air gap 70 between the poles 71, 72 of a magnet with the long dimension of the cross-section and the major axis of the ellipse of the cross-section of the rod 86 both at 45 degrees to the direction of the magnetic field H.

It is a feature of those embodiments which employ a body of gyromagnetic material to provide the coupling between the several waves that, by appropriate proportionment and biasing in a fashion now well known, the wave-supporting properties of the body become non-reciprocal. This prevents the travel of waves which may be reflected at the load or at the filter from traveling in the reverse direction to interfere with the forward waves. It therefore reduces the importance of an impedance match between the propagation path and the load. All that is necessary to secure nonreciprocal performance with the parametric embodiments is to build them asymmetrically. See, for example, "Ferrites at Microwaves," by N. G. Sakiotis and H. N. Chait, 41 PIRE 87, January 1953, and "Guided Wave Propagation Through Gyromagnetic Media—Part II," by H. Suhl and L. R. Walker, 33 BSTJ 939, July 1954, FIG. 1. There is no incompatibility between the magnetic bias requirements for nonreciprocal behavior and those for parametric behavior. For parametric behavior the ferrite is preferably biased to ferromagnetic resonance at a frequency close to the pump frequency. Thus biased, and having an asymmetric configuration, it attenuates the backward pump wave while allowing the forward pump wave to flow. Since there can be no interaction unless all three waves of interest flow in the same direction (Equation 8 cannot be satisfied) backward-flowing signal and idler waves cannot grow. Hence, the bias for nonreciprocality at the pump frequency makes for nonreciprocal behavior at all frequencies of interest.

It is another characteristic of such materials that they may carry waves of magnetization motion over a wide frequency band. This behavior is discussed by L. R. Walker in "Magnetostatic Modes in Ferromagnetic Resonance," published in The Physical Review for January 15, 1957, vol. 105, page 390. Hence, a traveling wave parametric amplifier may be operated in a magnetostatic mode, in a fashion related to the operation of bodies of such materials in magnetostatic modes in a standing wave parametric amplifier of the type described in the aforementioned application of H. Suhl.

The mechanism, internal to the ferromagnetic body, by virtue of which it furnishes the required inter-mode coupling, when operating in a magnetostatic mode, resides in certain anomalous ferromagnetic resonance phenomena found in materials, such as ferrites, that are subjected to strong radio frequency field. These anomalous phenomena have been reported in the scientific literature. They have been discussed and explained as extreme instances of subharmonic resonance by H. Suhl in The Physical Review, for February 15, 1956, vol. 101, page 1437. This monograph suggests the mechanism, internal to the ferrite, which is responsible for such subharmonic resonance and also for the coupling which it furnishes between oscillation fields in one direction at a particular frequency and pumping energy fields in another direction at double that frequency. This internal coupling mechanism is further elaborated mathematically in a monograph by H. Suhl entitled "The Nonlinear Behavior of Ferrites at High Microwave Signal Levels," published in the Proceedings of the Institute of Radio Engineers for October 1956, vol. 44 at page 1270.

Various modifications of the structures illustrated for carrying out the invention will suggest themselves to those skilled in the art. To take but a single example, it is well known in the transmission line art that, if desired, an impedance transformation from high current and low voltage to low current and high voltage, or vice versa, may be secured by the use of a tapered transmission line. It is within the contemplation of the invention that any of the transmission paths heretofore discussed, whether they be of the lumped circuit variety as in FIG. 1 or the continuous variety as in FIGS. 1–15 may, if desired, be tapered, thereby to provide a desired impedance transformation along with the power amplification heretofore discussed. In the practice of the present invention with this refinement it is important so to correlate the phase constants of the three waves that the requirements of Equation 8 shall be met for each measured distance along the propagation path, and that the group velocities of the signal and idler waves shall preferably be everywhere alike. This presents no particular difficulty because if, in such a tapered line, the inductance per unit length and the capacitance per unit length vary in inverse ratio, the phase constant $\beta$ for each of the waves remains independent of the distance along the line.

What is claimed is:

1. A traveling wave amplifier which comprises an extended structure proportioned to support the travel, without transport of charges, of at least three traveling waves of frequency $f_1$, $f_2$ and $f_p$, respectively, and of phase constants $\beta_1$, $\beta_2$ and $\beta_p$, respectively, $$\left(\beta = \frac{\omega}{v};\ \omega = 2\pi f\right)$$

from one end thereof to the other end thereof, the length of said structure between said ends being at least several times greater than the wavelength of the lowest frequency one of said waves, said structure including wave-responsive variable reactance means distributed throughout said length for presenting to the lower frequency ones of said waves a reactance that is varied by and in synchronism with the pumping wave, connections for launching a wave of pumping energy and of frequency $$f_p = f_1 + f_2$$

into one end of said structure and at a high energy level, thereby to vary the reactance of said distributed means at the pump frequency $f_p$ and so to cause the travel, from said one end of said structure toward the other end of said structure, of a reactance variation wave of frequency $f_p$, and connection for launching a signal wave of frequency $f_1$ and of energy substantially less than that of said pumping energy wave into said one end of said structure, whereby an idler wave of frequency $$f_2 = f_p - f_1$$

is generated through the influence of said reactance variation wave on said signal wave, said structure being proportioned to suppress the travel of undesired waves of other frequencies in the mode of said idler wave and at speeds at which they might interact unfavorably with said pump wave and said signal wave or said idler wave and to satisfy the relation $$\beta_p = \beta_1 + \beta_2$$

among said phase constants, thus to coordinate the phase velocities of said waves to promote gain-producing parametric interaction among them throughout the length of said structure, whereby said signal and idler waves travel from said one end of said structure to said other end of said structure, growing in amplitude at the expense of said pumping energy wave as they advance, and means for withdrawing an amplified counterpart of said signal wave from said other end of said structure.

2. Apparatus as defined in claim 1 wherein said structure comprises a first path proportioned to carry the signal wave, a second path proportioned to carry the idler wave, and a third path proportioned to carry the pumping energy wave, each of said paths being proportioned to carry waves within a narrow frequency band centered on the frequency of its assigned wave and to exclude waves of unwanted frequencies, and wherein said wave responsive means comprises nonlinear reactance means coupling the pump wave path to the signal wave path and to the idler wave path at at least several points of said paths within each wavelength of the lowest frequency one of said waves.

3. In combination with apparatus as defined in claim 2, a nonreflective termination connected to the output point of said signal wave path, a nonreflective termination connected to the output point of said idler wave path, and a unidirectional feedback path connecting the output point of said pump wave path to its input point, the electrical length of said feedback path being an integral number of wavelengths at the pump frequency.

4. Apparatus as defined in claim 2 wherein each of said transmission paths comprises a chain of circuit sections, connected in tandem, each having a lumped series inductance element and a lumped shunt capacitance element, there being at least several such sections for each wavelength of the lowest frequency one of said waves, wherein each of the signal path chain and of the idler path chain includes lumped variable reactance elements, and wherein the pumping path chain includes means for varying said lumped elements.

5. Apparatus as defined in claim 2, wherein the pump wave path is constituted of a hollow metal waveguide of substantially circular cross-section, wherein the signal wave path is constituted of a first pair of parallel linearly elongated conductors extending within said waveguide from end to end thereof and lying in a first plane containing the axis of said waveguide, wherein the idler wave path is constituted of a second pair of parallel linearly elongated conductors within said waveguide and extending within said waveguide from end to end thereof and lying in a second plane, perpendicular to said first plane, wherein the variable reactance means is constituted of a body of magnetically polarizable ferromagnetic material which, when appropriately polarized, exhibits strong gyromagnetic resonance effects at microwave frequencies, said body being disposed in the region bounded by the conductors of said first and second pairs, and means for applying a steady magnetic field in a direction transverse to the axis of said body and with a magnitude to bias it to gyromagnetic resonance at the pumping frequency.

6. In combination with apparatus as defined in claim 5, a nonreflecting termination connected to the output ends of said first conductor pair, a nonreflecting termination connected to the output ends of said second pair, and a reflecting termination connected to each end of said waveguide.

7. Apparatus as defined in claim 2, wherein the pump wave path is constituted of a hollow metal waveguide of substantially circular cross-section, wherein the signal wave path is constituted of a first pair of parallel linearly elongated conductors extending within said waveguide from end to end thereof and lying in a first plane containing the axis of said waveguide, wherein the idler wave path is constituted of a second pair of parallel linearly elongated conductors within said waveguide and extending within said waveguide from end to end thereof and lying in a second plane, perpendicular to said first plane, wherein the variable reactance means is constituted of a slab of magnetically polarizable ferromagnetic material which, when appropriately polarized, exhibits strong gyromagnetic resonance effects at microwave frequencies, said slab being disposed lying in said second plane, the conductors of said idler wave path pair being embedded in said slab, and means for applying a steady magnetic field in a direction transverse to the longer axis of said slab and to the magnetic field of the pump wave, and of a magnitude to bias it to gyromagnetic resonance at the pumping frequency.

8. Apparatus as defined in claim 1, wherein said extended structure comprises a first hollow metal waveguide having a slot in one wall extending from end to end thereof, said waveguide being proportioned to carry the signal wave and the idler wave together, and a second hollow metal waveguide having a slot in one wall and and extending from end to end thereof, said last-named slot being juxtaposed with said first-named slot, said second waveguide being proportioned to carry the pump wave, wherein the variable reactance means is constituted of a rod of magnetically polarizable ferromagnetic material which, when appropriately polarized, exhibits strong gyromagnetic resonance effects at microwave frequencies, said rod being disposed within said slots and extending from end to end thereof, and means for applying a steady magnetic field to said rod, in a direction transverse to the axis of said rod and of a magnitude to promote gyromagnetic resonance of the material of said rod at substantially the pumping frequency.

9. Apparatus as defined in claim 8 wherein said first waveguide is of rectangular cross-section having two longer walls and two shorter walls, said longer walls spanning a half wavelength at one of said signal and idler frequencies, said shorter walls spanning a half wavelength at the other of said signal and idler frequencies, and wherein said second waveguide is of rectangular cross-section having two longer walls and two shorter walls, said longer walls spanning a half wavelength at the pump frequency, said shorter walls spanning a half wavelength at a frequency substantially less than the sum of said pump and idler frequencies.

10. Apparatus as defined in claim 1 wherein said extended structure is constituted of a single transmission line proportioned to support said traveling pump, signal and idler waves in the same propagation mode, and to suppress propagation in said mode of waves of higher frequencies than the wanted waves.

11. Apparatus as defined in claim 10 wherein said extended structure comprises a pair of parallel strips of conductive material extending from end to end of said structure, and a body of ferroelectric material substantially filling the space between said strips, the thickness of said body spanning substantially one half wavelength at the pump frequency, and a source of steady voltage connected between said strips to bias said body to a desired point of its nonlinear voltage-capacitance characteristic, whereby the voltage of said pumping energy source acts to vary the capacitance of said body above and below said mean capacitance.

12. Apparatus as defined in claim 10 wherein said extended structure comprises a pair of parallel strips of conductive material extending from end to end of said structure, and a dielectric body of magnetically polarizable ferromagnetic material which, when appropriately polarized, exhibits strong gyromagnetic resonance effects at microwave frequencies, said body substantially filling the space between said strips, the thickness of said body spanning substantially one half wavelength at the pump frequency, and means for applying a steady magnetic field to said body in a direction normal to its long dimension and at 45 degrees to the planes of said strips, and of a magnitude to bias said body to gyromagnetic resonance at the frequency of said pumping energy wave, whereby the magnetic fields of said pumping energy source within said body act to vary its effective inductance as seen by the signal source.

13. Apparatus as defined in claim 10 wherein said extended structure comprises a first outer hollow conductor and a second inner conductor disposed within and coaxially with said first conductor, a body of magnetically polarizable ferromagnetic material which, when appropriately polarized, exhibits strong gyromagnetic resonance effects at microwave frequencies, said body being disposed within said outer conductor, alongside of said inner conductor, extending substantially from end to end of said transmission line, and means including a magnet for applying a steady bias magnetic field to said body in a direction normal to the long dimension of said line and at 45 degrees to an axial plane passing through said two conductors and said body, and of a magnitude to bias said body to gyromagnetic resonance at the pump frequency.

14. Apparatus as defined in claim 10 wherein said extended structure comprises a conductor having the form of a helix, and wherein said variable reactance means comprises a rod of magnetically polarizable ferromagnetic material which, when appropriately polarized, exhibits strong gyromagnetic resonance effects at microwave frequencies, said rod being disposed within said helix and extending from end to end thereof, the diameter and pitch of said helix being proportioned to support waves of said pump, signal and idler frequencies, traveling at substantially like propagation speeds, and to suppress waves of higher frequencies, and means for applying a steady magnetic field to said rod at an angle of substantially 45 degrees to its long dimension and of a magnitude to promote gyromagnetic resonance of the material of said rod at the frequency of said pump wave.

15. Apparatus as defined in claim 1 wherein said extended structure is constituted of a single chain of circuit sections connected in tandem, there being at least several such sections in each single wavelength span of said chain at the lowest of said frequencies, each of said sections having a series inductive reactance element and a shunt capacitive reactance element, at least one of said elements of each section having a nonlinear characteristic, and means including a source of steady current for biasing said nonlinear elements to preassigned points of their characteristics, whereby the high energy pumping wave acts to vary the reactances of said nonlinear elements in succession, thus to establish said reactance variation wave.

16. Apparatus as defined in claim 1 wherein said extended structure is constituted of a single chain of circuit section connected in tandem, there being at least several such sections in each single wavelength span of said chain at the lowest of said frequencies, each of said sections having a nonlinear series inductive reactance element comprising a coil wound on a ferromagnetic core and a nonlinear shunt capacitive reactance element comprising a condenser having a dielectric of ferroelectric material, means including a steady source for applying bias current to said coils and bias voltage to said condensers, thereby to bias said nonlinear reactance elements to preassigned points of their characteristics, and a load, connected to the output terminals of said chain, having an impedance that is matched to the characteristic impedance of said chain, thereby to bring the pump frequency current in said chain into phase coincidence with the pump frequency voltage across said chain, whereby the high energy pumping wave acts to vary adjacent capacitive and inductive reactance elements in phase opposition so that the effects of such variations are additive, and to vary said reactance element pairs in succession, thus to establish said reactance variation wave.

17. Apparatus as defined in claim 1 wherein said extended structure comprises a conductor having the form of a helix proportioned to support said pumping energy wave and a dielectric waveguide, proportioned to support said signal and idler waves, consisting of a rod of magnetically polarizable ferromagnetic material having a dielectric constant substantially in excess of unity, which material, when appropriately polarized, exhibits strong gyromagnetic resonance effects at microwave frequencies, said rod being disposed within said helix and extending from end to end thereof, the diameter and pitch of said helix being proportioned to suppress waves of frequencies higher than the pump frequency, and means for applying a steady magnetic field to said rod at an angle of substantially 45 degrees to its long dimension and of a magnitude to promote gyromagnetic resonance of the material of said rod at the freqeuncy of said pump wave, whereby said dielectric waveguide is incapable of supporting traveling waves of frequencies higher than said pump wave.

18. Apparatus as defined in claim 1 wherein said extended structure comprises a hollow metal waveguide of rectangular cross-section having two longer sides and two shorter sides, proportioned to support the pump wave, and a dielectric waveguide comprising a rod of magnetically polarizable ferromagnetic material having a dielectric constant substantially in excess of unity, which material, when appropriately polarized, exhibits strong gyromagnetic resonance effects at microwave frequencies, said rod being disposed within and on the axis of said hollow metal waveguide and extending from end to end thereof, said dielectric waveguide being proportioned to support said signal and idler waves and to cause their travel from end to end thereof at like propagation speeds, a slab of dielectric material disposed within said hollow metal waveguide for equalizing the propagation speed of said pump wave with the speeds of said signal and idler waves, and means for applying a steady magnetic field to said rod in a direction normal to its long dimension and at an angle of substantially 45 degrees to the planes of said longer sides of said hollow metal waveguide and of a magnitude to promote gyromagnetic resonance of the material of said rod at the frequency of said pump wave.

References Cited in the file of this patent

UNITED STATES PATENTS 2,805,333 Waters _____ Sept. 3, 1957
2,906,868 George _____ Sept. 29, 1959

OTHER REFERENCES

De Grasse et al.: "Proceedings of the IRE," July 1957, pages 1013–1015.

Landauer: "Journal of Applied Physics," March 1960, pages 479–484.

Reed: "IRE Transactions on Electron Devices," April 1959, pages 216–224 (page 222 relied on).